US012271892B2

(12) United States Patent
Sarwaikar et al.

(10) Patent No.: US 12,271,892 B2
(45) Date of Patent: Apr. 8, 2025

(54) SYSTEM AND METHOD FOR IMPLEMENTING A BLOCKCHAIN PLATFORM THAT CREATES AND MANAGES SECURED TOKENS

(71) Applicant: Livegage, Inc., Morganville, NJ (US)

(72) Inventors: Anupam Sarwaikar, Morganville, NJ (US); Bhaktavatsalam Yadlapalli, Mechanicsburg, PA (US)

(73) Assignee: Livegage, Inc., Morganville, NJ (US)

( * ) Notice: Subject to any disclaimer, the term of this patent is extended or adjusted under 35 U.S.C. 154(b) by 54 days.

(21) Appl. No.: 18/140,276

(22) Filed: Apr. 27, 2023

(65) Prior Publication Data

US 2024/0362620 A1 Oct. 31, 2024

(51) Int. Cl.
*G06Q 20/36* (2012.01)
*G06Q 40/03* (2023.01)
*G06Q 50/163* (2024.01)
*H04L 9/32* (2006.01)

(52) U.S. Cl.
CPC ............. *G06Q 20/36* (2013.01); *G06Q 40/03* (2023.01); *G06Q 50/163* (2013.01); *H04L 9/3213* (2013.01)

(58) Field of Classification Search
CPC ....... G06Q 20/36; G06Q 40/03; G06Q 50/163

USPC ...................................................... 705/35–45
See application file for complete search history.

(56) References Cited

U.S. PATENT DOCUMENTS

| | | | |
|---|---|---|---|
| 11,068,978 B1* | 7/2021 | Ferreira | H04L 9/3239 |
| 2022/0207605 A1* | 6/2022 | Yan | G06Q 20/3678 |
| 2023/0237600 A1* | 7/2023 | Agarwal | G06Q 50/16 |
| | | | 705/316 |
| 2023/0316439 A1* | 10/2023 | Slavin | H04L 9/50 |
| | | | 705/316 |
| 2023/0419276 A1* | 12/2023 | Agarwal | G06Q 20/3821 |
| 2024/0037650 A1* | 2/2024 | Agarwal | H04L 9/50 |
| 2024/0037681 A1* | 2/2024 | Agarwal | G06Q 50/16 |

\* cited by examiner

*Primary Examiner* — Robert R Niquette
(74) *Attorney, Agent, or Firm* — Hunton Andrews Kurth LLP

(57) ABSTRACT

An embodiment of the present invention is directed to storing a loan asset on a blockchain by using a secured note as a unique secured token (or non-fungible token (NFT)). An embodiment of the present invention may provide tokenization of a note to service a residential mortgage debt on a private blockchain. As recognized by an embodiment of the present invention, property may be uniquely represented by various characteristics including property address and/or property characteristics, such as bedrooms, bathrooms, garage, etc. Accordingly, an embodiment of the present invention may represent the underlying collateral (property) as a unique NFT.

18 Claims, 11 Drawing Sheets

Unique Property Attributes 610

| | |
|---|---|
| - Property Address<br>    ○ Address Line 1<br>    ○ Address Line 2<br>    ○ City<br>    ○ County<br>    ○ State<br>- Property Type (SFR, MFR, Condo, Pud)<br>- Borrower Name<br>- Co-Borrower Name<br>- No of Bedrooms<br>- No of Bathrooms<br>- No of Stories<br>- Has Garage<br>- No of Garage<br>- Has Basement<br>- Has Pool<br>- Has Parking (Carport/RV/Boat Parking) | - Heating system installed<br>- Cooling system installed<br>- Has Den/Office<br>- Has Fireplace<br>- Floor type<br>- Has Spa/Hot Tub<br>- Has Horse Facilities<br>- Has View (Waterfront, Hill, Lake, River, Golf Course lot)<br>- Has Security installed<br>- Has Community Amenities<br>    ○ Pool<br>    ○ Spa/Hot Tub<br>    ○ Golf Course<br>    ○ Boat Facilities<br>    ○ Clubhouse<br>    ○ Gym<br>    ○ Security |

Property Loan (Loan Note) Attributes 620

| | |
|---|---|
| - All attributes of Property (mentioned above) +<br>- Loan Number<br>- Note Date<br>- Note Amount<br>- Note Interest Rate<br>- Assessor Number (Appraisal Report)<br>- Parcel Number (Appraisal Report)<br>- Product Type (FRM, ARM, Option ARM)<br>- Loan Type (FHA, VA, USDA, SCRA)<br>- Payment Frequency | - Maturity Date/Tenure<br>- Lender/Originator<br>- Late Charge Terms & Conditions<br>- Is Escrow Loan<br>- Monthly/Biweekly/Bimonthly Payment<br>- MERS Id<br>- Interest Calculation Method (Monthly/DSI)<br>- Servicer Name |

Figure 6

SYSTEM AND METHOD FOR IMPLEMENTING A BLOCKCHAIN PLATFORM THAT CREATES AND MANAGES SECURED TOKENS

FIELD OF THE INVENTION

The invention relates generally to a system and method for implementing a blockchain platform that creates and manages loan notes as secured tokens, such as non-fungible tokens (NFTs).

BACKGROUND OF THE INVENTION

The U.S. residential mortgage industry has been transformed from a straightforward product and process into a highly complex, extremely interdependent ecosystem that remains characterized by redundant and manual practices. Complexity exists at every step, and the industry has been gradually adopting technology to streamline the origination process to make the consumer experience at the earliest stage of the process smoother and faster.

This complexity, however, has led to a significant decline in efficiency and customer experience in the mortgage servicing stage of the mortgage lifecycle, which suffers from a host of inadequacies due to its distinct set of regulatory, agency, and market-driven requirements as well as its dependence on an archaic, legacy technology platform first developed over 50 years ago. These problems are exacerbated by the fact that loan repayment takes place over decades, creating a cumulative snowball of inefficiencies that cost servicers precious time and money.

Homeownership is an important financial goal and taking out a mortgage loan and purchasing a home is the biggest financial decision and largest—and longest—investment most people will make in their lifetimes. The lifecycle of a mortgage loan begins with the origination process, which includes applying for a loan, processing the application, credit checks and considerations by the lending institution, and the closing process. Once the loan is closed, the debt becomes the legal responsibility of the borrower, and the lending institution retains a legal lien on the property until the final payment is made.

Post-closing, the most common action is for a lender to sell off portions of the loan or even the entire loan to other lenders and investors in what is known as the secondary market. The repayment phase of the loan is by far the longest, lasting 15 to 30 years or longer. This phase is managed by a mortgage servicer. Once the loan is repaid in full, the lien is removed from the property and the borrower owns the home completely.

Outstanding U.S. residential mortgage debt is approximately $12.5 trillion and the ecosystem comprises four major stakeholders—originators, investors, servicers, and customers, as well as peripheral players, including the Consumer Financial Protection Bureau (CFPB), rating agencies, auditors, and government-sponsored enterprises (GSEs).

Mortgage servicing is the backbone of the mortgage ecosystem. Without rethinking the entire servicing operation, implementing industry-wide transformation is difficult, if not unachievable. The mortgage servicing industry's inability to innovate and implement new technologies has been hampered by its ties to an antiquated legacy technology system. The current system hampers efficient workflows, costs an excessive amount of money to run and maintain, and requires an increasing number of staff members to create and manage the integration of endless third-party systems and workaround solutions. In short, the current system lacks the agility necessary to reckon with the unprecedented digital transformation hurtling toward the industry. Servicers are forced to integrate third-party systems that raise technological and regulatory risk as well as overall costs.

Currently, there are no tools in the existing legacy infrastructure to effectively manage workflow and streamline operations.

These and other drawbacks exist.

SUMMARY OF THE INVENTION

According to an embodiment, the invention relates to a system that implements a secured token marketplace on a distributed ledger system. The system comprises: an interface that communicates with one or more client systems via a communication network; and a server comprising a computer processor coupled to the interface and in communication with a distributed ledger system, the computer processor further configured to: receive, via the interface, a request for a first secured token that represents a property wherein the property is uniquely identified by a set of property attributes; based on the set of property attributes, generate a first secured digital token for the property; process a request for a loan on the property represented by the first secured digital token to generate a loan note for the property wherein the loan note is uniquely identified by a set of loan attributes; based on the set of loan attributes, generate a second secured digital token for the loan note; associate the first secured digital token and the second digital token to a borrower of the loan; transmit the first secured digital token and the second digital token to the distributed ledger system; and associate the first secured digital token and the second digital token with a digital wallet that enables one or more transactions to be made on the first secured digital token and the second digital token in a digital marketplace.

According to another embodiment, the invention relates to a method that implements a secured token marketplace on a distributed ledger system. The method comprises the steps of: receiving, via an interface, a request for a first secured token that represents a property wherein the property is uniquely identified by a set of property attributes, wherein the interface communicates with one or more client systems via a communication network; based on the set of property attributes, generating a first secured digital token for the property; processing a request for a loan on the property represented by the first secured digital token to generate a loan note for the property wherein the loan note is uniquely identified by a set of loan attributes; based on the set of loan attributes, generating a second secured digital token for the loan note; associating the first secured digital token and the second digital token to a borrower of the loan; transmitting the first secured digital token and the second digital token to a distributed ledger system; and associating the first secured digital token and the second digital token with a digital wallet that enables one or more transactions to be made on the first secured digital token and the second digital token in a digital marketplace.

The system and method may utilize a specially programmed computer system comprising one or more computer processors, interactive interfaces, electronic storage devices, and networks. The computer implemented system, method and medium described herein provide unique benefits and advantages to consumers/borrowers, investors, auditors and other participants, users or entities, according to various embodiments of the invention.

An embodiment of the present invention recognizes the challenges facing the mortgage industry and those of servicers in particular. An embodiment of the present invention is directed to providing the tools and customized technology to streamline and enhance existing operations while breaking down barriers to entry for those looking to enter the servicing business.

The innovative platform architecture and module design provide customers the option of a complete or single, customizable module solution. An embodiment of the present invention provides an efficient cloud-based implementation with lower coordination and support costs. The transformation of servicing creates a more secure, efficient, digitized mortgage ecosystem enabling all stakeholders to leverage decentralized finance.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 6 is a listing of attributes, according to an embodiment of the present invention.

DETAILED DESCRIPTION OF THE PREFERRED EMBODIMENT(S)

Figure 1A:
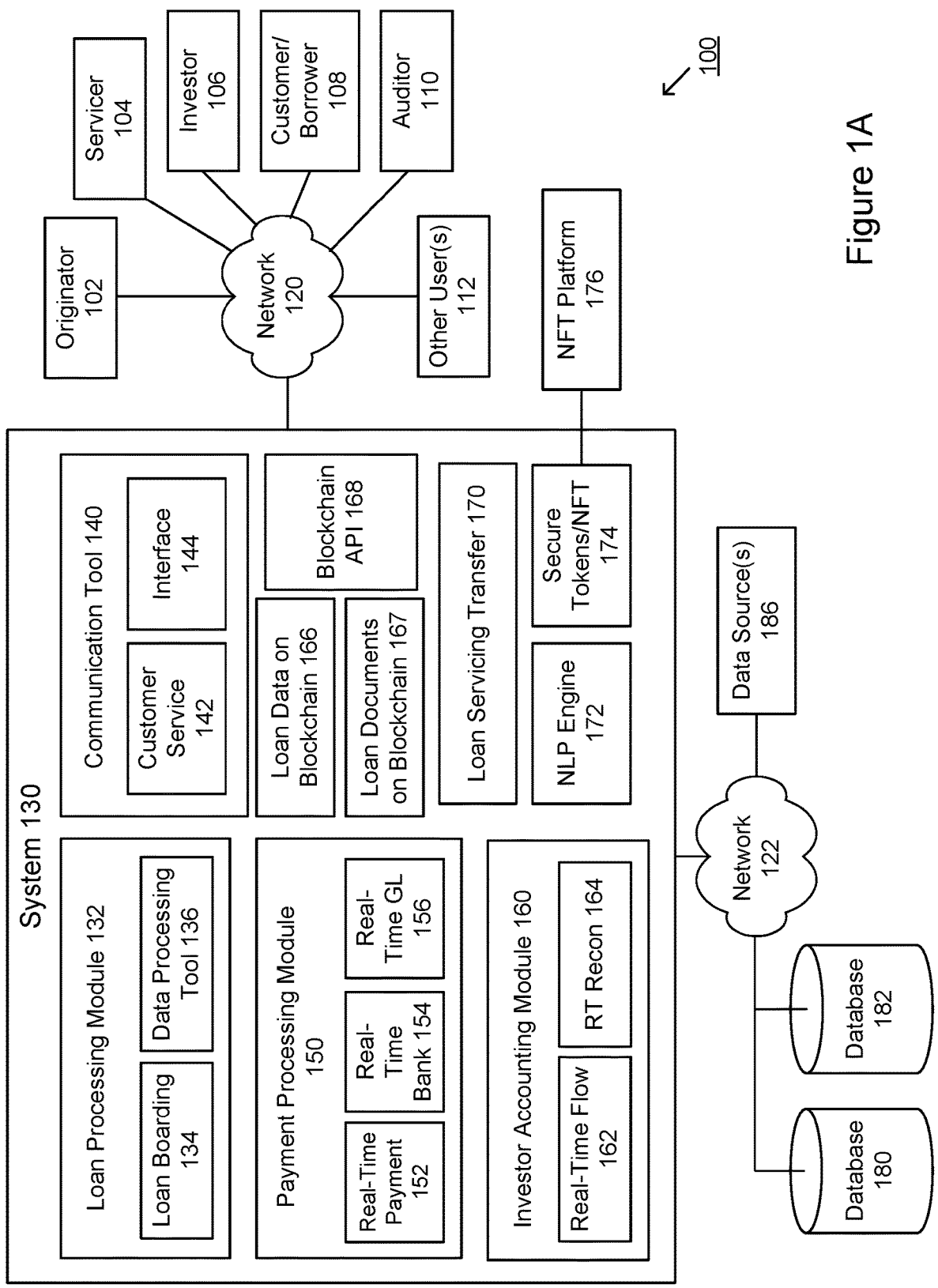
FIG. 1A is an exemplary system diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an innovative platform that improves servicing of mortgage loans. Participants of the mortgage business may include customers/borrowers who take a loan to purchase residential real estate and make monthly payments towards the loan or mortgage. Investors own the loan while servicers are responsible for collecting the monthly payments which are placed in a custodial account and then remitting the proceeds to the investors (or owners of the loan). In addition to collecting the monthly payments, servicers also apply the principal, taxes, insurance and make payments such as property tax. If payment is not received, then the servicer contacts the borrower. Auditors perform an audit that involves a comprehensive analysis of mortgage data to determine any violations or discrepancies associated with a borrower's mortgage. This may involve ensuring compliance with various regulations.

An embodiment of the present invention is directed to a data-driven, analytics-based system that increases efficiencies and reduces costs for all stakeholders in the ecosystem. An embodiment of the present invention is directed to leveraging Artificial Intelligence (AI) and Machine Learning (ML) technologies focused on complex borrower issues and prioritizing customer care.

For originators, AI and ML models may use data to predict conversion rates and help originators focus on high-value leads more likely to take out loans. These models may also flag at-risk loans in the origination/underwriting process and detect potential fraud. For servicers, AI and ML may be applied to build models for call/contact prioritization, e.g., "best time to call," based on customer behaviors and identification of borrowers looking for workout agreements or facing changes in their finances. Investors may benefit from improved default and prepayment models, which help develop hedging strategies designed to mitigate risk. Borrowers may access personalized products, advice, and better servicer communication. In addition, self-service decision support may assist borrowers to evaluate the financial impact of workout options when facing payment challenges as well as simplify and speed up the loan modification process.

Operational efficiencies may be improved across the platform as blockchain technology, artificial intelligence, and machine learning eliminate or substantially reduce inefficient and arcane processes while ensuring regulatory compliance. Efficiencies may be realized in other areas in the servicing operation, including loan boarding, loan administration, escrow, tax and insurance, cash processing, letter writing, records and collateral, loss mitigation, foreclosure, bankruptcy, claims processing, etc.

An embodiment of the present invention is directed to implementing a platform with an intuitive user interface that substantially reduces the need for systems training and increases productivity. According to an embodiment of the present invention, the user interface may enable borrowers to easily access information about their loans, make payments accurately, upload and receive documentation easily, and communicate seamlessly with their servicers in a self-service digital manner. In addition, a fully responsive browser and mobile app will allow customers and operations professionals to securely work and manage loans from anywhere.

FIG. 1A is an exemplary system diagram, according to an embodiment of the present invention. System 130 may support various functions and features including Loan Boarding Module 132, Communication Tool 140, Payment Processing Module 150, Investor Accounting Module 160, Loan Data on Blockchain 166, Loan Documents on Blockchain 167, Blockchain API 168, Loan Servicing Transfer 170, NLP Engine 172 and Secured Tokens/NFT 174 which communicates with NFT Platform 176.

System 130 may interact with various entities as an integrated system/component or as a third party service entity. For example, an entity, such as a financial institution, may host System 130. Users may interact with System 130 via Network 120. System 130 may receive data from various sources including Databases 180, 182, Data Source(s) 186, etc. Databases 180, 182 may store and manage data relating to real estate properties, loans, transactions, analytics, visualizations, etc. Various forms of data may be stored and managed. Other implementations and relationships may be realized.

Interface 144 may enable various users to interact with components and services provided by System 130. Interface 144 may include browser or other user interactive interface. User interaction may be supported through various user devices, including computers, laptops, mobile devices, smartphones, tablets, etc. Users may include Originator 102, Servicer 104, Investor 106, Borrower 108, Auditor 110 and other users represented by Other User(s) 112, such as various agencies. While a single entity is shown for illustration purposes, multiple users and/or participants may be supported.

For example, Investor 106, such as a loan owner, may interact with System 130 for investor reporting, portfolio surveillance, modeled versus actual comparisons, etc. Customer/Borrower 108 may interact with System 130 through a website, mobile app, chatbot as well as other self-service options. For example, Customer/Borrower 108 may make payments, receive loss mitigation assistance, etc. Other User(s) 112 may represent Accounting Services to perform automated bank reconciliation, automated general ledger entries, forecasting models, etc. Other User(s) 112 may include Call Centers that interact through an Intelligent Agent Portal. Other operations that may be supported include Non-Performing Loan Operations (e.g., loss mitigation, foreclosure/bankruptcy, claims, etc.) and Performing Loan Operations (e.g., loan boarding, loan administration, escrow, tax and insurance, cash processing, letter writing, records and collateral, etc.).

For non-performing assets, borrowers may agree to a modified payment plan for delinquent loans. The new terms of the payment plan, along with borrower communications, may be stored and tracked on a blockchain. This promotes efficiency and ensures compliance with various regulations and other requirements, including timely notifications, etc.

Blockchain API 168 may communicate with a Blockchain Node, NFT Platform 176 and/or other networks to register a secured token on a blockchain or distributed ledger.

System 130 may support various services including loan processing (e.g., originating loans, loan servicing, etc.), communications and services, payment processing, accounting services, auditing services, etc.

Loan Processing Module 132 may support loan set-up, transfers and processing, as shown by Loan Boarding 134 and Data Processing Tool 136.

Loan Boarding Module 134 is directed to facilitating loan setup and transfer, reduce the costs, and deliver benefits that percolate throughout the loan lifecycle. Loan Boarding may involve the process where loans change hands from lenders to servicers or servicers to servicers. Handling sensitive data, such as borrower details, loan terms and conditions, and original documents at this stage makes this already data-heavy process extremely vulnerable to errors. The process, which can take from 30 to 90 days, includes receiving the data and documents from the prior lenders/servicers, extracting and mapping data from the files to servicers' systems, identifying discrepancies in data/documents, and preparing the portfolio for servicing after remediating the discrepancies.

Data Processing Tool 136 is directed to processing and deciphering data coming from multiple sources that lacks standardization—and to do it in the shortest possible time by mapping data to standard data fields. Data Processing Tool 136 focuses on at least three core aspects of loan boarding data: Data Transfer, Data Mapping and Data Storage.

Data Transfer may involve a Blockchain-based loan transfer. Data Transfer may offer security and easy accessibility to authorized personnel. It further achieves faster, reliable, and cost-efficiency as data moves seamlessly over a secure network and records changes that occur during the process.

Data Mapping may include a ML-based mapping module and support NLP-based document recognition and indexing. This further reduces manual intervention and improves accuracy as well as increases the turnaround time for processing each set of data.

Data Storage provides a reliable and cost-efficient cloud infrastructure to store data. This offers flexibility and scalability in addition to easy accessibility and management and further drastically reduces the cost by eliminating huge investments in storage infrastructure.

Communication Module 140 supports various modes of communication, including via website, mobile device, chat feature, etc. Communication Module 140 may also provide an enhanced customer service experience shown by 142 and interactions via various interfaces, shown by 144. An embodiment of the present invention is directed to facilitating a customer's interaction with the servicer across multiple mediums.

Customer Service functions may include: website registration and customer onboarding; co-browsing capabilities; multiple payment options; access to bills and updates; real-time payment processing; payoff automation; homeowners assistance; education videos; etc.

Payment Processing Module 150 is directed to simplifying various cashiering and payment processes through user-friendly, automated platforms. This enables servicers to have freedom and control over the processes as they configure them to suit their terms and conditions. Payment Processing Module 150 may support automated and real-time payment applications via payment plans or schemes (e.g., waterfall payment, installment payments, etc.) as shown by Real-Time Payment 152; real-time bank transactions and reconciliation as shown by Real-Time Bank 154; and real-time general ledger (GL) posting and generation as shown by Real-Time GL 156.

Real-Time Payment 152 supports a configurable payment waterfall to enable automated payment application with minimal human intervention. This may include a pre-configured government sponsored enterprise (GSE) waterfall template for a plug-and-play experience for associated servicers. Real-Time Payment 152 provides a faster and reliable process to perform repetitive tasks, reducing personnel cost; and further minimizing regulatory and compliance issues arising out of erroneous application of principal, interest, escrow, fee, and advances. Real-Time Payment 152 may further reduce the error-rate by running processes through an automated, pre-configured program.

Real-Time Bank 154 supports real-time bank transaction and reconciliation. Bank transactions post in real-time, creating an authentic and verifiable transaction trail for reconciliation and audit purposes. Real-Time Bank 154 may mitigate chances of missed or erroneous postings thereby reducing manual reconciliation of historical data. Accordingly, overall costs and resources may be reduced due to reduction or elimination of errors and reversals where real-time data may further support effective and timely decision making.

Real-Time GL 156 supports real-time general ledger (GL) posting and generation. GL entries for transactions may be generated and posted in real-time to appropriate GLs. In addition, GL entries and balances may be available for review at any time. Accounting ledgers may be available with up-to-date transaction history. For example, GL balances and posting may be retrievable in one click or other simplified user interaction. With an embodiment of the present invention, dependable GL posting functionality makes third-party accounting systems redundant, resulting in immense cost savings on systems and personnel.

Communication Tool 140 may represent various forms of communication to support customer service functions, as shown by 142. Communication Tool 140 may also include an Interface 144 that interacts with a user as well as user system or application. For example, Communication Tool 140 may facilitate sending letters and notices to borrowers during a servicing tenure, which is traditionally an extremely cost-intensive.

Figure 1B:
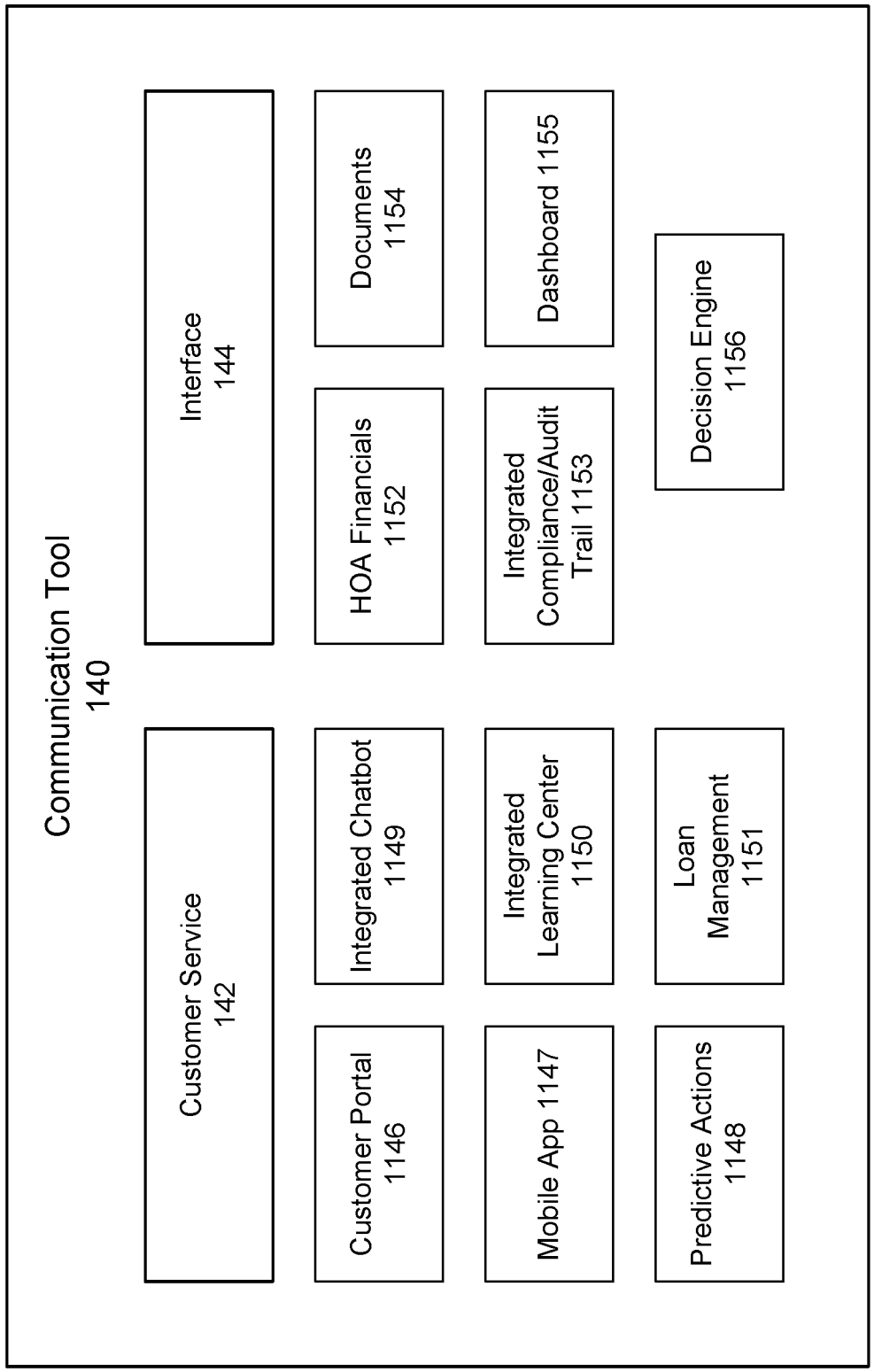
FIG. 1B is an expanded illustration of communication tools, according to an embodiment of the present invention.

FIG. 1B is an expanded illustration of communication tools, according to an embodiment of the present invention. As shown in FIG. 1B, Customer Service 142 may support Customer Portal 1146, Mobile App 1147, Predictive Actions 1148, Integrated Chatbot 1149, Integrated Learning Center 1150 and Loan Management 1151. Interface 144 may support HOA Financials 1152, Integrated Compliance/Audit Trail 1153, Documents 1154 and Dashboard 1155. Communication Tool 140 may also support Decision Engine 1156. Other functions and services may be supported.

Customer Portal 1146 may leverage artificial intelligence and machine learning to deliver a personalized and exponentially improved customer experience within an intuitive and customizable user interface.

An embodiment of the present invention may support by various mobile applications, as represented by Mobile App 1147.

An embodiment of the present invention is directed to reducing calls to call centers while increasing customer satisfaction with an improved integrated portal. Driven by machine learning technology, an embodiment of the present invention is directed to proactively predicting customer behavior and delivering situational messaging and notifications based on a customer's previous site activity as well as real-time interactions and recent loan activity. Predictive Actions 1148 provides AI and ML driven custom and predictive calls to action and tailored messaging.

Other features may include: integration with real estate marketplaces for increased engagement and cross-sell opportunities; Integrated Chatbot 1149 provides extensive functionality and superior responsiveness; custom calculators; an Integrated Learning Center, as shown by 1150; and Loan Management 1151 that provides streamlined loan management including integrated flexible payment options.

An embodiment of the present invention is directed to providing a personalized dashboard for real-time loan information, as shown by Dashboard 1155.

An embodiment of the present invention is directed to homeownership support with real-time insights and recommendations for informed decision-making, via a Homeowners Assistance (HOA) App. HOA financial details may be provided via HOA Financials 1152.

For customers facing financial challenges, the HOA App provides self-service tools and resources to request payment assistance. An embodiment of the present invention is directed to reducing default management timelines and increasing successful workout percentages with an easily integrated, user friendly online application that prequalifies customers for a payment assistance plan in minutes, and further decreasing the likelihood of serious delinquency, without a call to a customer service agent.

Other features may include: an intuitive user interface that collects customer information with no or minimal agent intervention necessary; integrated compliance and audit trail information, as shown by 1153; automated completion of various forms; automated and seamless supporting document collection, as shown by 1154; servicer support with dashboards and access to customer survey responses, as shown by 1155; and Decision Engine 1156 for prequalification with viewable waterfall.

An embodiment of the present invention facilitates and simplifies communications by providing a communication tool that may be integrated with a servicing system. In addition to offering customization of letters, the communication tool may be used to schedule recurring events and generate ad hoc letters for one or multiple loans in the portfolio. Other services may include: configurable letter templates and creating recurring and ad hoc mail campaigns. Customizable templates and schedules for repetitive events may be supported.

Investor Accounting Module 160 may provide accounting services including Real-Time Flow 162 and Real-Time Reconciliation 164. An embodiment of the present invention recognizes that investors rely heavily on the financial accounting reports provided by servicers to understand the health of their portfolios and to make crucial decisions. Oftentimes, a multitude of reports are made available on a daily/weekly/monthly basis to investors. The reports may contain information about individual loans, portfolios, bank accounts, and expenses.

Pulling relevant data, performing accounting transactions, and reconciling every detail can be overwhelming for employees. Incompetent systems coupled with outdated technology only make matters worse.

An embodiment of the present invention addresses the gravity of the issue through its servicing system with features that post transactions and generate reports in real-time. The comprehensive accounting and reporting feature provides valuable insights into a portfolio at multiple levels for user-defined durations.

Real-Time Flow 162 supports a real-time flow of a monies dashboard. For example, a dashboard may illustrate a bird's eye view of the portfolio and further enable the user to perform detailed analysis of desired parameters with a simple user interaction, e.g., one click. Managerial review may be supported through the dashboard that shows monies flowing through the servicing lifecycle of loans. This also provides real-time information to enable timely decision making and corrective measures to reduce monetary and reputational losses.

Real-Time Reconciliation 164 provides real-time custodial and bank account reconciliation. Transactions may be posted and recorded in real-time in custodial and bank accounts thereby reducing time and cost of fetching data for reconciliation.

Loan Data on Blockchain 166 and Loan Documents on Blockchain 167 are directed to storing loan data and loan documents on a distributed ledger, such as a private blockchain through a Blockchain API 168 or other interface. This enables access to an entire history of transactions and relevant data associated with a loan. An embodiment of the present invention supports various users, participants, etc. For example, investors may access data on the blockchain in real-time through an interface, such as an investor portal. With current systems, servicers and investors require back and forth communications which tend to lead to delay and inefficiencies. With an embodiment of the present invention, daily cash details are available in real-time. This facilities cash reconciliation, audit processes, etc. Additional details are provided in related application, U.S. patent application Ser. No. 18/140,204, titled "SYSTEM AND METHOD FOR IMPLEMENTING A BLOCKCHAIN PLATFORM," filed concurrently, the contents of which are incorporated herein by reference in their entirety.

Loan Servicing Transfer 170 facilitates transfers from one servicer to another. An embodiment of the present invention recognizes that investors may select different servicers for a particular loan or portfolio of loans. For example, an investor may transition from servicer 1 to servicer 2. With current systems, servicer transitions require a transfer of many years' worth of data with back and forth communications. The current process, however, is time-consuming with a high risk of data loss and errors. With an embodiment of the present invention, storing loan data on the blockchain with supporting data enables users to easily access the data and further ascertain when each document was generated, transmitted, shared, etc. Other loan history data may be available. Accordingly, the servicer transition process of an embodiment of the present invention is highly efficient, simplified with significant cost savings. Additional details are provided in related application, U.S. patent application Ser. No. 18/140,239, titled "SYSTEM AND METHOD FOR IMPLEMENTING A BLOCKCHAIN PLATFORM FOR LOAN SERVICING," filed concurrently, the contents of which are incorporated herein by reference in their entirety.

An embodiment of the present invention recognizes that investors also sell pooled loans in a secondary market where investors may then sell to a new investor. In this scenario, the new investor (or buyer) may want to perform their own due diligence. With an embodiment of the present invention, due diligence may be performed on the blockchain by appraising the loan, accessing historical data and verifying information in real-time.

An embodiment of the present invention is directed to developing an innovative Natural Language Processing (NLP) Engine, as shown by NLP Engine 172. As shown in FIG. 1, NLP Engine 172 may ingest guidelines from various sources and then create an optimal payment plan, e.g., payment waterfalls to service various loans. This may also involve automatically generating code to process the loans. For example, when loans become delinquent and a borrower defaults, an agency may make the payments. In such a scenario, there are specific regulations that need to be followed and if any one of these are missed, the claim amount may be reduced. According to an embodiment of the present invention, NLP Engine 172 may ingest such regulations including requirements, deadlines, etc. to ensure compliance. NLP Engine 172 may receive and ingest various types of documents including loan notes as well as other documents that are relevant to other industries. Additional details are provided in related application, U.S. patent application Ser. No. 18/140,310, titled "SYSTEM AND METHOD FOR IMPLEMENTING A NATURAL LANGUAGE PROCESSING PLATFORM," filed concurrently, the contents of which are incorporated herein by reference in their entirety.

Secured Tokens/NFT 174 may communicate with various platforms and marketplaces, as illustrated by NFT Platform 176. An embodiment of the present invention is directed to generating a secured token for a specific property which may be unique identified based on a combination of various characteristics including property address, loan date, loan amount, first payment date, etc. The NFT represents a unique secured token that may be placed on a node of a blockchain. With an embodiment of the present invention, the NFT may be transacted on in a marketplace or platform, such as a NFT marketplace. As equity in the property grows through monthly payments, the owner may extract a portion of the equity on marketplace which may be used for a new transaction or instrument, such as a new line of credit. Accordingly, the NFT marketplace/platform supports a decentralized environment for the mortgage industry.

For purposes of illustration, an embodiment of the present invention may be applied to mortgages such as residential property. However, the invention is not limited to mortgages and may be applied to other types of loans including credit card loans, automobile loans, student loans, small business loans, etc. Moreover, the embodiments of the present invention may be applied to various other industries, beyond the mortgage industry.

The system 100 of FIG. 1A may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Networks 120, 122 may be a wireless network, a wired network or any combination of wireless network and wired network. For example, Networks 120, 122 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Networks 120, 122 may support an Internet network, a wireless communication network, a cellular network, Bluetooth, or the like, or any combination thereof. Networks 120, 122 may further include one, or any number of the exemplary types of networks mentioned above operating as a stand-alone network or in cooperation with each other. Networks 120, 122 may utilize one or more protocols of one or more network elements to which it is communicatively coupled. Networks 120, 122 may translate to or from other protocols to one or more protocols of network devices. Although Networks 120, 122 is depicted as one network for simplicity, it should be appreciated that according to one or more embodiments, Networks 120, 122 may comprise a plurality of interconnected networks, such as, for example, a service provider network, the Internet, a cellular network, corporate networks, or even home networks, or any of the types of networks mentioned above.

Data may be transmitted and received via Networks 120, 122 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1A illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals. Interface 144 may represent a user interface and/or other interactive communication portal.

System 130 may be communicatively coupled to Databases 180, 182. Databases 180, 182 may include any suitable data structure to maintain the information and allow access and retrieval of the information. For example, Databases 180, 182 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases 180, 182 may be any suitable storage device or devices. The storage may be local, remote, or a combination thereof with respect to Databases 180, 182. Databases 180, 182 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases 180, 182 may have back-up capability built-in. Communications with Databases 180, 182 may be over a network, or communications may involve a direct connection between Databases 180, 182 and an entity. Databases 180, 182 may also represent cloud or other network based storage.

Figure 1C:
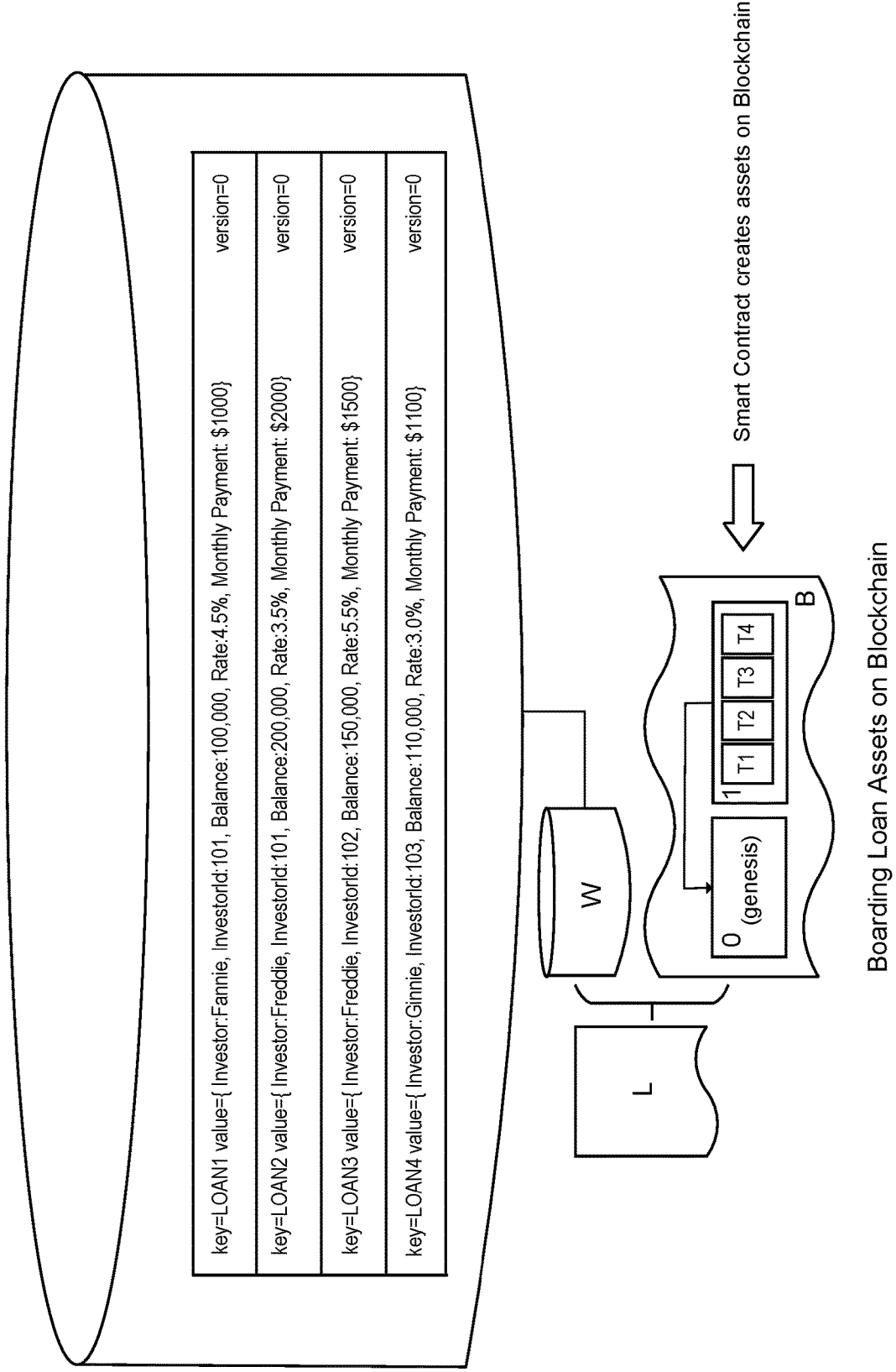
FIG. 1C is an exemplary illustration of loans as assets on a blockchain, according to an embodiment of the present invention.

FIG. 1C is an exemplary illustration of loans as assets on a blockchain, according to an embodiment of the present invention. FIG. 1C illustrates boarding loan assets on the blockchain where a smart contract creates assets on the blockchain. Ledger L includes a world state W and a blockchain B where W includes keys with values. Blockchain B contains two blocks 0 and 1. In this example, Block 0 represents a genesis block and Block 1 contains four transactions: T1, T2, T3 and T4. FIG. 1C illustrates keys that represent loans, LOAN1, LOAN2, LOAN3 and LOAN4. In this example, each loan has a corresponding value that includes Investor, InvestorID, Balance, Rate, and Monthly Payment. With each update, a corresponding version number will also change. For example, when a payment is made on a loan, the payment is received and distributed and the loan balance is adjusted. Each update is a new block on the blockchain. Accordingly, a history of all transactions and updates may be captured. At any time, an entire and complete history of servicing a loan is available. This is particularly useful for regulatory agencies and ensuring compliance. FIG. 1C may support other transactions, such as monthly payment processing, disbursement processing, bank reconciliation, investor accounting, etc.

With all data and transactions on the blockchain, various actions are available using the same blockchain source data. This promotes consistency and accuracy of real-time transaction data. For example, the system may post to an accounting system, perform bank reconciliations, generate investor reports, etc.

An embodiment of the present invention may be applied to various stages of a loan, including loan boarding, loan processing and loan modifications (e.g., new terms, new payment plan). All of this may be captured on the blockchain along with various borrower communications.

Data and documents may be stored on the blockchain from lenders, prior servicers, existing servicers, etc. For example, transactions representing cash flow and other actions may be stored on the blockchain from various sources including payment gateways, borrowers, payments made to vendors, invoices for third parties, taxes being paid, etc.

An embodiment of the present invention is also directed to assisting customers with loss mitigation, modifications, borrower assistance, collection agency interactions, communications, etc. In such instances, there is a constant communication with the borrower through various channels including email, chat, text, regular mail, etc. Accordingly, the communications and hashcodes may be stored on the blockchain. This further supports compliance with servicing guidelines as well as regulatory and other requirements. Moreover, cross referencing and verification procedures and efforts may be simplified and streamlined.

Figure 1D:
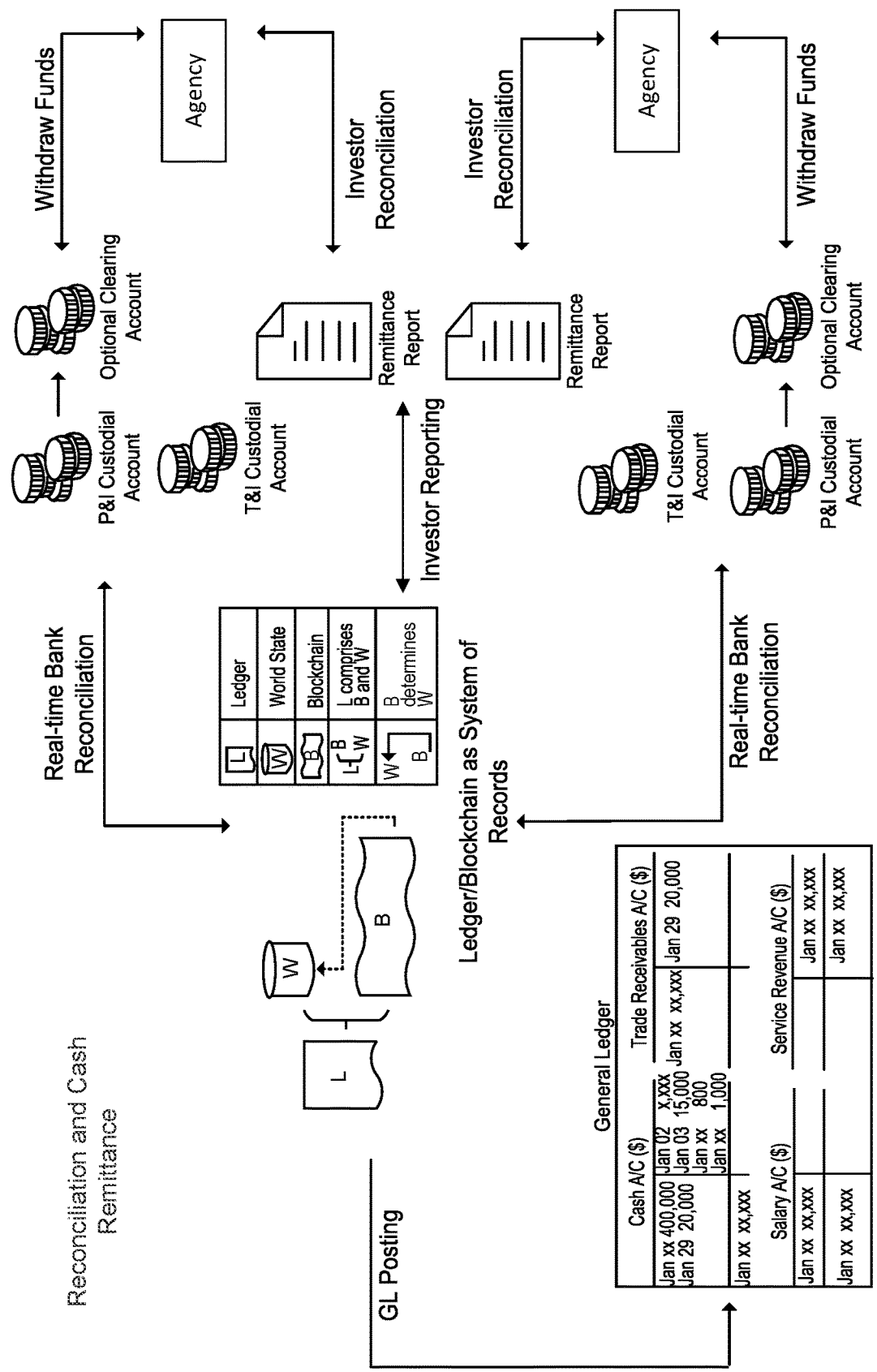
FIG. 1D is an exemplary flowchart, according to an embodiment of the present invention.

FIG. 1D is an exemplary flowchart, according to an embodiment of the present invention. FIG. 1D illustrates reconciliation and cash remittance. More specifically, FIG. 1D shows incoming cash reconciliation and cash remittance on blockchain. Ledger/Blockchain represents a System of Records, where various functions and services may be supported, such as General Ledger (GL) Posting, Real-Time Bank Reconciliation, and Investor Reporting. Agencies may interact with Clearing Accounts and Custodial Accounts and further support actions, such as withdraw funds, investor reconciliation, etc.

Figure 1E:
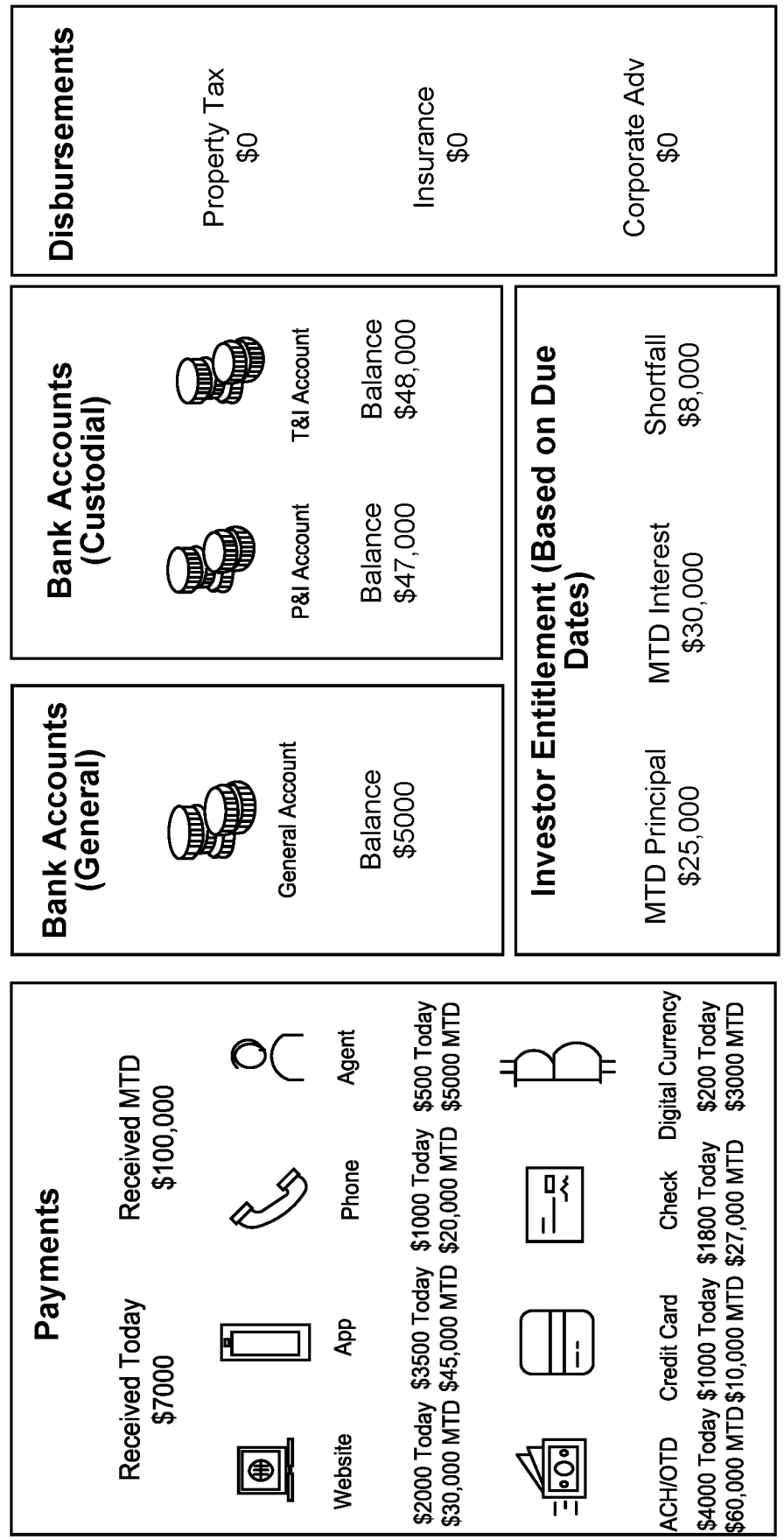
FIG. 1E is an exemplary dashboard, according to an embodiment of the present invention.

FIG. 1E is an exemplary dashboard, according to an embodiment of the present invention. FIG. 1E illustrates a flow of monies dashboard. Interface may support Payments, Bank Accounts (General), Bank Accounts (Custodial), Investor Entitlement (based on due dates), Disbursements. Payments may include payments received today, month to date as well as other filter. Bank Accounts (General) may represent balances relating to general accounts. Bank Accounts (Custodial) may represent balances associated with P & I Accounts and T & I Accounts. Investor Entitlement may include principal, interest, shortfall, etc. Disbursements may include Property Tax, Insurance and Corporate Advances.

Figure 2:
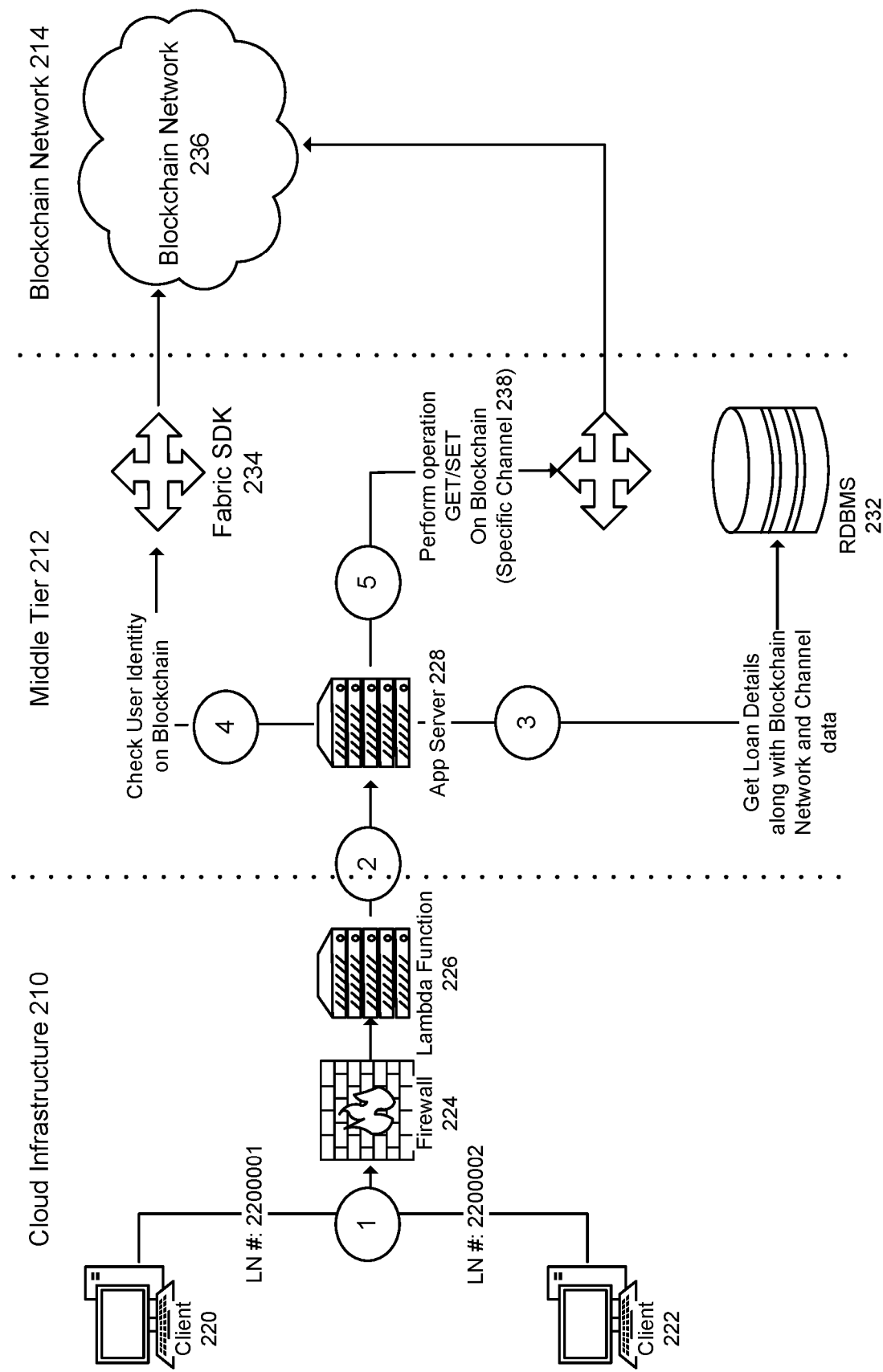
FIG. 2 is an exemplary architecture diagram, according to an embodiment of the present invention.

FIG. 2 is an exemplary architecture diagram, according to an embodiment of the present invention. FIG. 2 illustrates Cloud Infrastructure 210, Middle Tier 212 and Blockchain Network 214. Clients 220, 222 may request data from a Blockchain Network 236. The request may include a loan identifier, e.g., LN #2200001, LN #2200002. The client may interact with a network security device, such as Firewall 224 and Lambda Function 226. The request may then be received at Middle Tier 212 by App Server 228. Blockchain Network 236 may represent a technical infrastructure that provides ledger and smart contract services to applications. A smart contract may represent a program, also called a chain code.

Using the loan identifier, loan details along with the Blockchain Network and Channel Data may be retrieved from a data source, such as relational database management system (RDBMS) 232. User identity may be validated through Fabric SDK 234 which communicates with Blockchain Network 236. App Server 228 may then perform an operation GET/SET on the Blockchain Network 236 through a Specific Channel 238. An embodiment of the present invention may use, an open-source permissioned blockchain framework. Permissioned blockchain framework is a modular framework that offers identity management and access control features.

An embodiment of the present invention is directed to implementing Blockchain in a Mortgage Ecosystem. An embodiment of the present invention combines blockchain technology with project/product technology to enable users to achieve an exponential increase in process automation, such as increased transaction transparency, activity tracking, data security, regulatory compliance and audit, and real-time data availability. For example, by combining blockchain technology with project technology, end users may interact and access loan data stored on a blockchain project user interface, access blockchain data through project APIs, etc.

Additional benefits may include: secure record keeping; immutable data (trust moves from humans to the blockchain as manual interventions are reduced); and increased transparency as all permissioned parties on the network may view records and cross verify with their own systems, reducing manual reconciliation of data. Data verification may be improved due to the blockchain storing all historical transaction data. Smart contracts enable the system to automate rules and validations before a transaction is entered onto the blockchain. The system may automatically accept or reject a transaction based on defined rules in the contract. Smart contracts may be available to all permissioned parties on the network who are then able to verify transactions before submitting their consensus to approve or reject.

In accordance with an embodiment of the present invention, storing mortgages, e.g., the loan data, on a blockchain (or distributed ledger technology) realizes significant efficiencies and benefits, such as saving mortgage servicers time, lower expenses, and reducing the operational burden of meeting regulatory requirements by eliminating manual document tracking and information reconciliation. An embodiment of the present invention further facilitates digitized payments and payment recording with embedded credit, compliance, risk alerts, and reporting.

An embodiment of the present invention is directed to a core servicing solution that moves data from various transactions in the blockchain to a secure data warehouse at the end of the day or other interval. Accordingly, this data may be easily and readily available at any time, with no or minimal security risk or potential manipulation issues. This seamless access to data significantly improves the overall response time of the servicing system. Additionally, the core servicing solution automates a large percentage of the servicing process and is further developed with a clean and intuitive dashboard with features designed to aid in remittance, cash accounting, and reporting. This facilitates real-time data sharing between various participants including servicers, investors, GSEs, regulators, and borrowers.

To address cybersecurity concerns, in particular as they relate to lending institutions, an embodiment of the present invention is directed to encrypting non-public data where the blockchain's inherently decentralized nature effectively executes an information security agenda.

Figure 3:
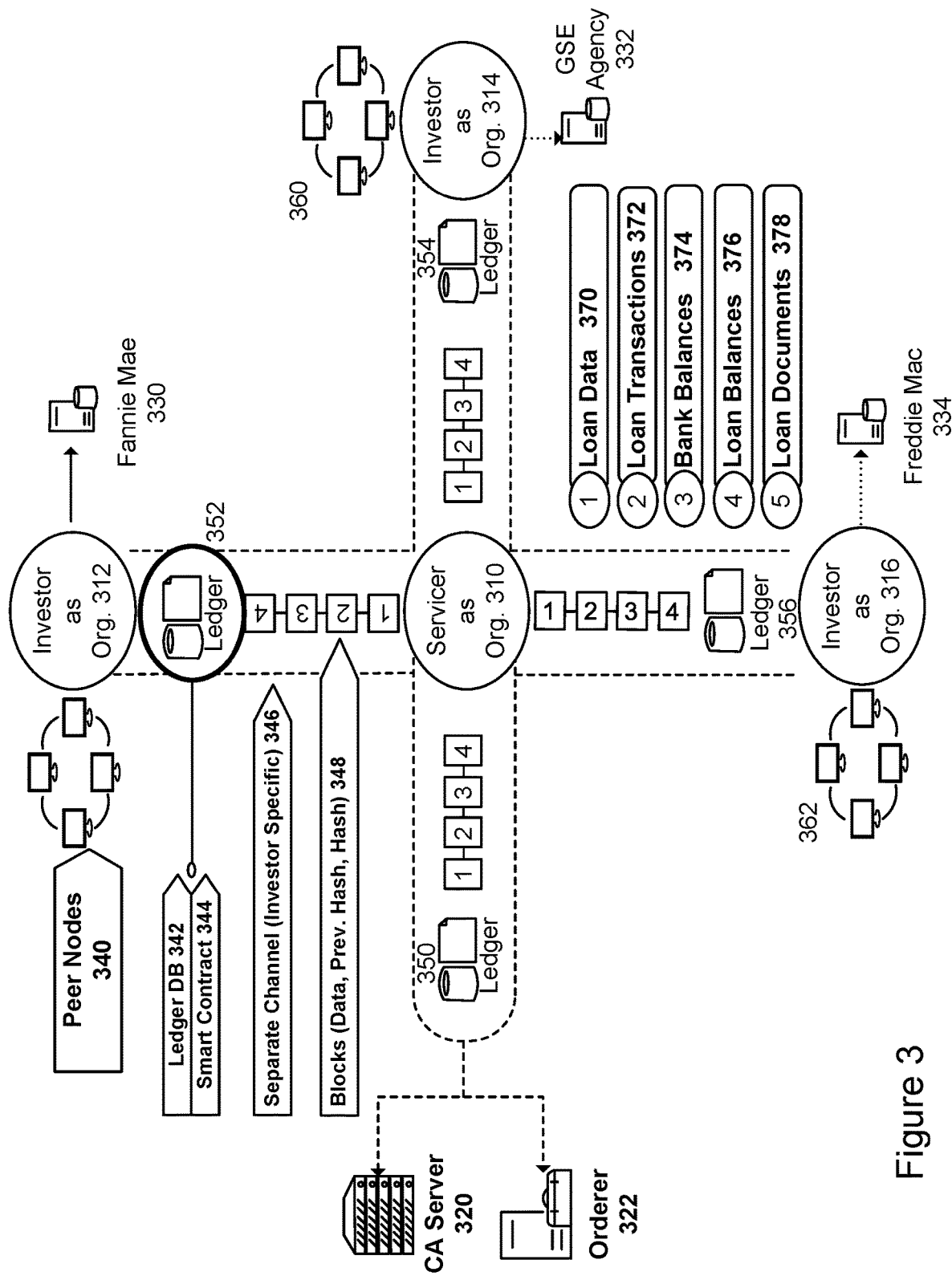
FIG. 3 illustrates an exemplary implementation where a Servicer is a main organization, according to an embodiment of the present invention.

FIG. 3 illustrates an exemplary implementation where a Servicer is a main organization, according to an embodiment of the present invention. In an exemplary blockchain network, the servicer may participate as the main, e.g., owner, organization as shown by 310. The servicer may control various operations, including how transactions will be treated in the blockchain network, how transactions will be validated, and what consensus algorithm the orderer node, as shown by 322, will follow. Orderer 322 may ensure the order of the transactions and consistency of the blockchain. The servicer may create and deploy smart contracts (e.g., business rules, validation, etc.). In addition, authentication and authorization policies may be defined by the servicer in the network. CA Server 320 may represent a certificate authority server that issues digital certificates to authenticate content. Further, the orderer node (e.g., transaction controller), as shown by 322, may be created and controlled by the servicer in the network. The servicer may grant permission to add a new investor as a participating organization into network. The servicer may create one channel to maintain its own system data, such as account balances. In the blockchain network, Ledgers are represented by 350, 352, 354, 356.

The system of FIG. 3 may support other implementations, such as an investor as a Participating Organization, as shown by 312, 314, 316. Investors may interact with government agencies, Fannie Mae 330, GSE Agency 332 and Freddie Mac 334, for example. Peer Nodes are shown by 340, 360 and 362 that host ledgers and smart contracts. For example, Peer Nodes 340 may host Ledger Database 342 and Smart Contract 344. Each investor may participate as client, reviewer, or auditor of their loans. For example, an investor may not have permission to initiate transactions on the blockchain network. When a new investor is added to the network, the servicer may create: a separate channel, as shown by 346, between the investor, as shown by 312, and servicer, as shown by 310, to ensure that all data/communications, as shown by 348, are secure as well as a separate ledger 352 between the investor and servicer for storing transaction data and history. Channel 346 may represent a private communication pathway between two or more members of a network, such as any permission blockchain network, where each transaction on a network occurs on a channel. Blocks 348 may represent a continuously growing list of records linked and secured using cryptography. Ledger 352 may store information relating to business objects—both the current value of the attributes of the objects and the history of transactions that resulted in the current values.

Initially, an investor may not be prepared to join the blockchain and may want to continue with its traditional means of data communication. In that case, an embodiment of the present invention may add that investor to the blockchain as a proxy organization, ensuring that the system will be ready for a future investor request to participate in the blockchain network. This provides consistency in data storage at the blockchain end along with a future option for the investor to start actively participating in the blockchain. Other scenarios and situations may be realized.

As shown in FIG. 3, an investor channel may support loan data and other supporting information, such as Loan Data 370, Loan Transactions 372, Bank Balances 374, Loan Balances 376, Loan Documents 378 and various different types of communication data. With loan data, represented by 370, when a new loan is boarded to the system, its digital asset may be created and added to the blockchain. Any changes to loan information may also be recorded to the blockchain, enabling the system to maintain a history of the changes.

With Payment Data/Loan Transactions, represented by 372, after processing the payments received from the borrower, an embodiment of the present invention may generate loan transactions prepared as digital assets and therefore candidates to store into the blockchain. Other activity in the system/application, that may or may not trigger amount movement, may generate a loan transaction that is a candidate for blockchain. An embodiment of the present invention may store loan transactions into the blockchain channel based on the loan investor.

With Custodial Bank Account Balances (e.g., Bank Balances 374, Loan Balances 376, Loan Documents 378, etc.), during the servicing of a loan, various activities taken on an account may require auditing where the reconciliation of accounts and balances may be considered a significant servicer responsibility. An embodiment of the present invention may store investor custodial account balances in the blockchain so that they may be made available to the investor in real-time as the transaction is occurring in the system. An embodiment of the present invention also stores servicer account balances in the blockchain so that the servicer may reconcile their own bank account balances with the system.

An embodiment of the present invention recognizes the importance for a servicer to store communications with borrowers for compliance with audits, adherence to government guidelines and reliance on data as proof in case of bankruptcy or foreclosure of the property. Communication data may include: emails, short message service (SMS), text messages, chat messages, facsimiles; letters, notices, disclosures or other documents sent to borrower electronically or regular mail; phone calls via call centers, representatives, etc. Communication data, which is specific to a borrower, may be prepared as digital assets and stored on the blockchain, which then becomes authenticated and tamper-proof data. The servicer may then rely on this data and further share with auditors or rely on the data for bankruptcy, etc.

An embodiment of the present invention is directed to adding loan details along with all financial transaction information on the blockchain for each loan.

To create transparency in operations, communication and activities and further ensure compliance to various rules defined by government agencies, such as Federal Housing Administration (FHA) or Veterans Affairs (VA), and guidelines defined by investors, such as Fannie Mae or Freddie Mac, a servicer may store loan details and transaction information on the blockchain.

Loan details may include: loan information; financial activities; general ledger entries; loan documents; communications, etc. Loan information may include: Borrower Name, Address, Phone/Mobile, Loan Note Amount, Note Date, current interest rate, etc. Loan information may also include Property Valuation data, Bankruptcy data, Foreclosure data and Loss Mitigation data. Property Valuation may include: Estimated Property Value and Property Valuation Date, etc. Bankruptcy may include: Bankruptcy Chapter, Bankruptcy Case Number, Bankruptcy Setup Date, Bankruptcy Filed Date, Bankruptcy Type, Number of Days in Bankruptcy, etc. Foreclosure may include: Sale Amount, Setup Date, Status Code, Removal Code, Deed Recorded Date, Stop Code, etc. Loss Mitigation may include: Loss Mitigation Open Date, Status Code, Removal Code, Template, Stage, etc. Financial activities may include: Payment Received, Principal Collected, Interest Collected, Payment transferred to Custodial Accounts (principal/interest (PI) & taxes and insurance (TI)) or Suspense Account, Escrow Disbursement which may be recorded as "Loan Transaction" on blockchain.

General Ledger entries resultant from financial activities may also be recorded as "GL Transaction" on blockchain.

Loan documents stored on blockchain may include documents/data: received from borrower throughout the life of loan; created and sent by servicer to borrower; received from third party vendor or government agencies etc.

Communications stored on blockchain may include: emails, mail/letters, facsimile; customer care agents; communications/interactions through website/portal, etc.

Various benefits may be realized by storing loan details on blockchain that relate to compliance, reconciliation, bankruptcy and foreclosure, reporting, etc., in accordance with the various embodiments of the present invention.

Regarding compliance, if the loan information along with all financial details are available on blockchain, an auditor is not required to wait for information or a data extract from system for days. The auditor may login at any time and cross-check all the information and validate the information against guidelines (e.g., FHA, VA, Freddie Mac, or Fannie Mae guidelines) followed or not.

Regarding reconciliation, because the system is recording transactions in real-time on the blockchain, interested parties may cross-check the transactions in real-time against bank transactions and reconcile data at any point of time. As an investor is also participating on the blockchain, the transactions may also be available on a certain channel (Distributed Ledger Technology (DTL)). DTL generally refers to the protocols and infrastructure that allow computer systems in various locations to propose and validate transactions and further update records across a network. Accordingly, investors may match and verify Custodial Bank Account balances with Actual Bank Account balances. This verification may be performed in real-time when this transaction has happened at a servicer end. As a result, the investor does not need to wait for month end files from servicer for reconciliation thereby realizing significant efficiencies.

In case of bankruptcy and foreclosure, blockchain may be useful to prove the authenticity of information, documents and more importantly communication between borrower and servicers.

Regarding reporting, as information is available to various parties (e.g., Servicer, Investors, Auditors, etc.) who are part of a blockchain network, the parties may generate different reports based on their needs. For example, an auditor may create an "Income Statement" or "Trial Balance" using "GL Transactions" available on blockchain. In another example, a servicer may create a "Remittance Report" while an investor may create portfolio analysis.

Figure 4:
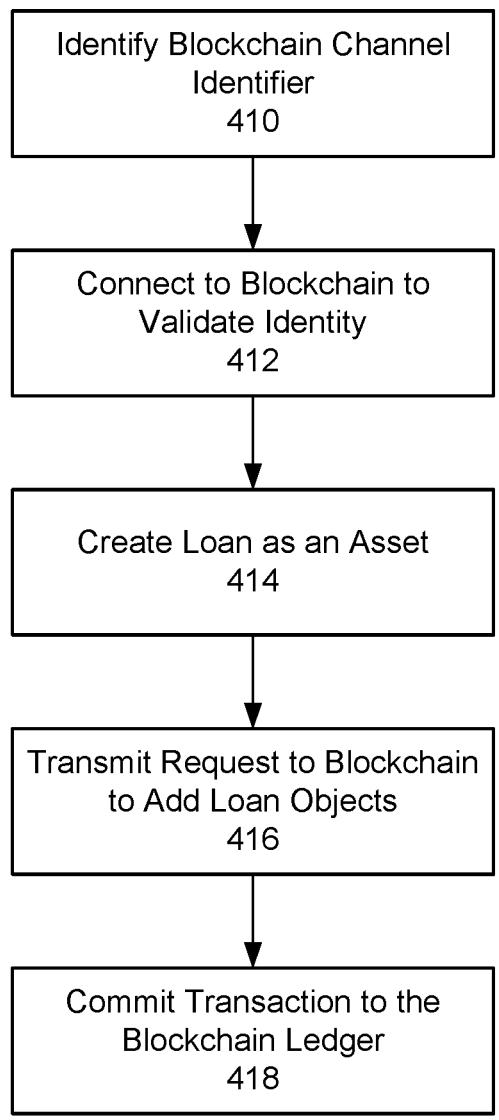
FIG. 4 is an exemplary flowchart of a loan boarding process, according to an embodiment of the present invention.

FIG. 4 is an exemplary flowchart of a loan boarding process, according to an embodiment of the present invention. At step 410, a blockchain channel identifier may be identified. At step 412, blockchain may be used to validate identity. At step 414, a loan may be created as a digital asset. At step 416, a request may be transmitted to add loan objects to the blockchain. At step 418, the transaction may be committed to the blockchain ledger. While the process of FIG. 4 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

According to an embodiment of the present invention, loan boarding may represent a process by which an investor transfers a pool of mortgage loans to a servicer. This data may come to the servicer in various formats and files, including .CSV. The servicer may process these files and add the loan data to the system.

Loan boarding may be considered a first step for loans entering the servicing workflow, and it is the natural starting point for adding loan data to the blockchain. Entering data in this manner from the start of the servicing cycle ensures the data is synchronized with the processes and activity that occur post-boarding and throughout the servicing period of the loan.

At step 410, a blockchain channel identifier may be identified. This may involve finding a blockchain channel name. Servicers service loan pools for specific investors. The blockchain network may be built between the servicers and their investor clients, where the privacy of investor data is critical. Security or other concerns may delay investor participation on a platform where data is available on a common network. To address the security concern and maintain the privacy of the data between the investors, a separate channel may be created between the servicer and each investor. Additionally, the information saved on the blockchain may be encrypted and the hash code may not be visible to the client until a privacy key and certificate are applied to decrypt it.

When a new loan object, e.g., asset, is added to the blockchain, the system may be required to know which investor owns the asset so the correct channel is selected for transactions on the blockchain.

At step 412, the system may connect to the blockchain network and validate the identity of the user attempting to post a transaction on the blockchain. Once the identity of the user is confirmed, the system allows the user to proceed.

At step 414, a loan may be created as a digital asset. The system may identify important identifying information about a loan and then bundle the information into a format that may be stored in blockchain as an asset. This data may be encrypted and then used to generate a hash value using an encryption algorithm, such as SHA 256 algorithm.

At step 416, a request may be transmitted to add loan objects (e.g., assets) to the blockchain. The system may submit a request to the blockchain, which redirects it to a smart contract. According to an embodiment of the present invention, the smart contract may represent a component used to validate the transaction, apply business logic and rules, and push a transaction request to a processing engine. In the case of loan boarding, a smart contract may be used to validate the loan information as well as prepare the transaction.

At step 418, the transaction may be committed to the blockchain ledger. Here, the system may wait for consensus (e.g., sign-off) from concerned participants in the blockchain network. The transaction requested for loan boarding may be given to the correct participants to validate its authenticity. If they find it is correct, they will provide sign-off and send it to a caller.

The client application, which has initiated this request, may check for confirmation from all parties and if it is "Yes," from all, the commit process may be initiated. This step may then prepare a hash value for the loan object (e.g., asset) and add it to the blockchain ledger as a key-value pair. The key must be unique to add a new loan to a blockchain ledger. For example, the loan number may be used as the unique key.

Various benefits may be realized by using blockchain in a load boarding process. For example, by boarding/adding loan data in encrypted format (e.g., hashed data) to a secured channel built between the servicer and the investor, only the parties on this channel may see/access the information and have a secret key. Accordingly, all data/communications are secure and investors cannot see each other's loans on the blockchain.

With an embodiment of the present invention, blockchain enables near real-time data availability for participating organizations to see the data and further verify the data. For example, investors and auditors may be able to see loan information and review transactions in real-time without depending on the servicer to provide data in a file each night.

An embodiment of the present invention facilitates and simplifies loan transfers between servicers. Depending on employees to facilitate the labor-intensive loan boarding process is inefficient and error-prone. According to an embodiment of the present invention, blockchain may decrease transfer timelines and costs by changing the ownership of records (assets) digitally while maintaining data integrity as well as the transaction history and ownership of the loan.

Figure 5:
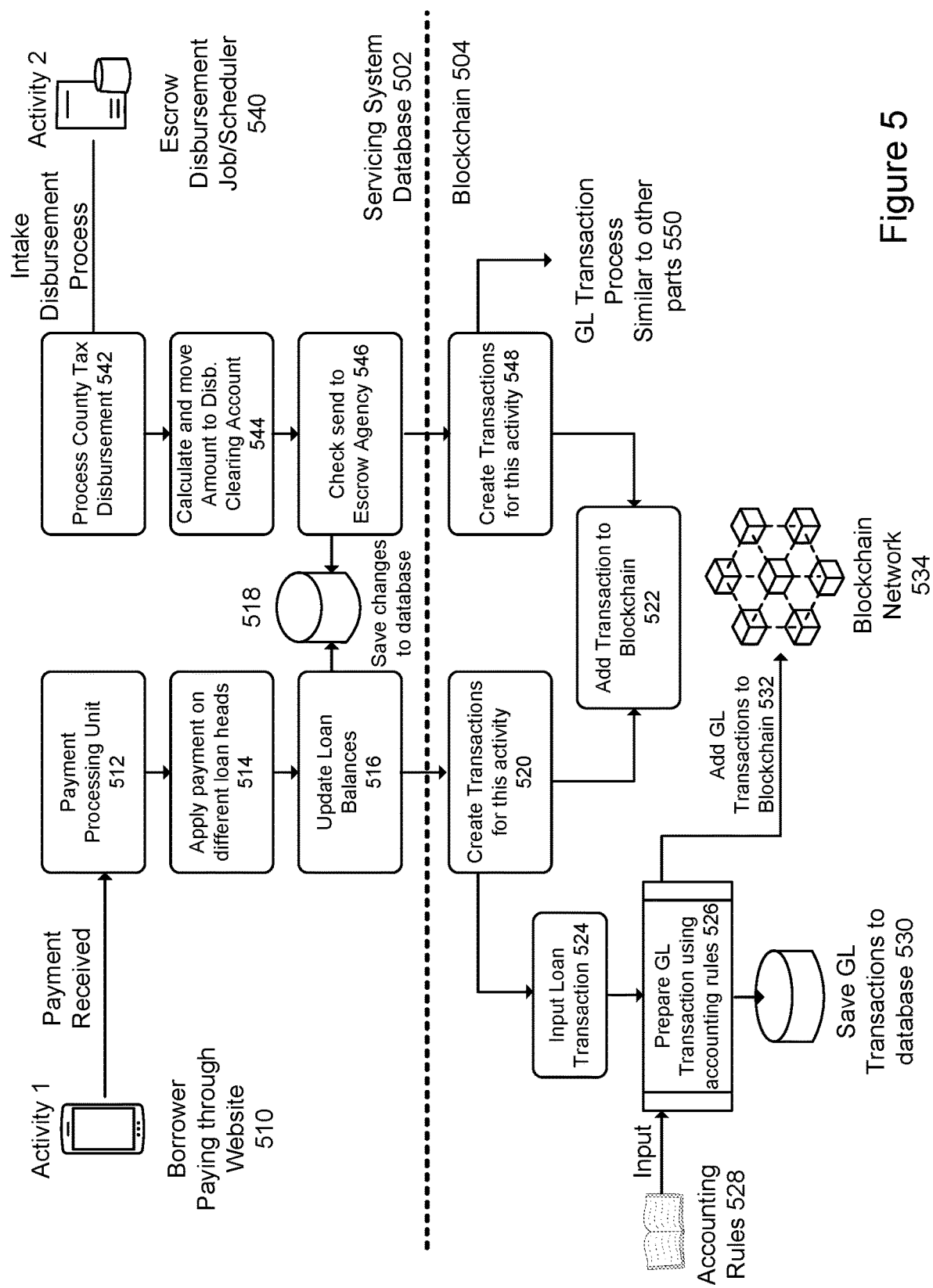
FIG. 5 is an exemplary illustration of loan level activity, according to an embodiment of the present invention.

FIG. 5 is an exemplary illustration of loan level activity, according to an embodiment of the present invention. An embodiment of the present invention is directed to Loan Transactions and General Ledger Transactions. With an embodiment of the present invention, transactional activities associated with a loan may be viewed as transactions in the system and recorded for use in reconciliations. Transaction activities may include a payment received from a borrower, a payment moved to a custodial account, a servicer advancing funds to a loan account in the case of an escrow shortage or short payment, and disbursing of a payment to an escrowed (insurance and tax) collection agency, etc.

Currently, these transactions are recorded in a traditional database system and shared with other parties (e.g., investors, auditors) at a fixed interval, i.e., daily, weekly, or monthly, so that other parties can also match and reconcile their systems. Servicers also use these transactions to match account balances, custodial account balances, income, and expense balances, e.g., to reconcile them with bank transactions and other balances.

By organizing transactions so that they are treated as assets on the blockchain, an embodiment of the present invention is directed to overcoming existing deficiencies of the current system and facilitating more efficient sharing of data between and within the organizations.

As shown by FIG. 5, an embodiment of the present invention is directed to a blockchain implementation to store loan and payment transactions. The blockchain implementation may support various activities including loan-level activity, general ledger (GL) transactions, etc.

For loan-level activities, during the normal course of servicing a loan, a servicer may engage in various activities that may or may not involve the movement of funds, which affects the account balances of parties, including the servicer, borrower, or custodian.

FIG. 5 illustrates two activities, Activity 1: Payment Received from Borrower and Activity 2: Escrow Disbursement. While two activities are shown for illustration purposes, additional activities may be supported.

For Activity 1, a borrower makes a payment using a website/mobile app, as shown by 510, which is assigned to the payment processing unit (PPU), at 512. The PPU may process the payment based on the loan due, shortages and/or rules defined by the servicer and may divide the amount into multiple categories, such as principal and interest. Payment may be applied on different loan heads, at 514. For example, loan heads may represent loan balances which may be updated when new payments are received and then distributed under different heads of loans, such as principal, interest, escrow, advances if any. Once the categories are calculated, the system may update the loan balances at 516, including unpaid principal balance (UPB) amount, escrow balance, custodial account balances, using these categories.

According to an embodiment of the present invention, the system may generate transactions for any processes that change balances or has money moving from one account to another, at 520. These transactions are first recorded into a traditional database at 518 and then sent to the blockchain processing unit at 522.

In this example, the loan UPB amount will decrease, the escrow balance will increase, the PI custodial account and TI custodial account will also be credited and so on.

As shown in FIG. 5, Activity 2 relates to Escrow Disbursement. Escrow disbursement may represent a process where the servicer makes required payments to tax authorities (e.g., city tax, county tax, etc.) and insurance companies (e.g., flood insurance, property insurance, etc.), as defined by the terms of the loan. These payments are generally scheduled as monthly, quarterly, or semi-annual premiums.

For example, each month when this job runs, it searches for loans that are scheduled for disbursement in the current month and consolidates or groups them by escrow payment receiver/beneficiary. As shown by FIG. 5, county tax disbursements may be processed at 542.

Once a list is prepared and approved by the servicer, the correct amount may be transferred to the disbursement clearing account (DCA), at 544.

Payments, such as checks, may be issued to "escrow payment receiver/beneficiary" from the DCA, at 546.

As in Activity 1, the system may generate transactions for any process that changes balances or has money moving from one account to another. Transactions may be created at 548 where GL transaction process may be applied at 550. The transactions are first recorded into a traditional database at 518 and then sent to the blockchain processing unit at 522.

In this case, the loan escrow balance will decrease, the TI custodial account will be debited, the disbursement clearing account will be credited, and so on.

An embodiment of the present invention may support General Ledger Transactions. General Ledger ("GL") transactions are important to any organization that wants to be on top of the financial health of the business. Many organizations hire accounting firms to input all business transactions to their accounting software to generate financial statements and reports, such as trial balance, income statements, etc., which helps them understand the health of the business and allows them to take corrective/preventive actions to maintain margins and profitability.

In the mortgage servicing world, both the servicer and the investor may require general ledger transaction data to generate financial statements to know and understand the health of the business. Investors, in particular, need to monitor loan pools to stay on top of pool performance and returns on investment. Investors often need to review the activities performed on loans that may affect their investments.

This data is often fed into the investors' accounting and modelling software. The timely reporting of data to investors is key to enabling them to stay ahead of macroeconomic and microeconomic events that may affect the value of a loan portfolio. The availability of real-time data in these instances will help the servicer keep borrowers abreast of changes affecting their payments and the resulting effects on the investor portfolio.

As shown in FIG. 5, an embodiment of the present invention is directed to GL Transaction Management Overview which includes managing GL transactions.

Each activity may generate a loan transaction that may be further processed and then stored to the blockchain. In the same or similar manner, these loan transactions may be used to generate GL entries. At 524, a loan transaction may be received as an input. Once loan transactions have been prepared, a new function may be triggered in parallel to generate GL transactions. This may queue to the processing unit (PU).

The PU may look up the accounting rules (e.g., GL rules), as shown by 528, which may be prepared by the servicer and entered into the system against the type of transaction, as shown by 526. There may be one or more rules preconfigured in the system by the servicer for each transaction.

The PU may run the rules against that particular transaction and generate a GL transaction. These may be saved into the database, at 530, and queued to the blockchain network 534, as shown by 532.

As discussed in connection with FIG. 4 above, a transaction may be prepared as an asset. For example, all the critical information about a loan transaction and the GL transaction may be identified and then bundled into a format that may be stored in the blockchain as an asset. For security, the asset may be encrypted and a hash value may be generated using SHA 256 algorithm. Other encryptions and security features may be applied.

A request to add the asset (or loan object) may be transmitted to the blockchain. According to an embodiment of the present invention, the request may be submitted to the blockchain, which in turn redirects the request to a smart contract, a component that validates the transaction, applies business logic and rules, and pushes the transaction request to the processing engine.

The transaction may then be committed to the Blockchain Ledger. Here, an embodiment of the present invention may wait for consensus (e.g., sign-off) from all participants available in the blockchain networks. The transaction object may be given to each participant to validate and run through a smart contract at their end. Upon passing validation, the participant may provide a sign-off to commit to the transaction.

The client application, which initiated the request, may check for confirmation from all parties and if it is a "Yes" from all, then it initiates the commit process.

For example, a hash value may be created for the loan transaction and the GL transaction separately and then added to the blockchain ledger as a key-value pair. In this example, the key must be unique in order to add a new transaction object to the blockchain ledger. Here, the string <LoanNumber>TX<TranId> may be created as a unique key for the loan transaction and <LoanNumber>GL<GL_TranId> for the GL transaction.

An embodiment of the present invention may realize various benefits from using blockchain technology for Loan Transactions and General Ledger Transactions. Because the system records transactions in real-time on the blockchain, investors and auditors may cross-check transactions in real-time against bank transactions and reconcile data at any time.

In the example of "Activity 1" (as shown by 510 in FIG. 5), the payment received from the borrower may generate multiple transactions, such as principal collected and escrow collected. This in turn may decrease the UPB amount of the loan and increase the investor's principal/interest (PI) custodial account and the taxes/insurance (TI) custodial account balance. The ability to view these updates in real-time is a significant benefit to all stakeholders.

In the case of an investor who is participating on the blockchain, transactions may be available to view on their channel (e.g., distributed ledger technology). The investor may match and verify custodial bank account balances with actual bank account balances in real-time. The investor no longer needs to wait for end-of-day or end-of-month files from the servicer to perform account reconciliation.

Similarly, an embodiment of the present invention records GL transactions on the blockchain in real-time. Investors may utilize these GL transactions and generate GL entries for their own accounting software. Once entries are posted to the accounting software, the investor may generate financial statements instantly and perform an immediate analysis at the portfolio and pool levels.

For example, during "Activity 1" (payment received from borrower), as shown by 510 in FIG. 5, loan transactions may be generated and further queued to generate GL transactions. In this example, a principal collected transaction may generate a GL transaction such as: PI custodial account debit; payment clearing account credit, etc.

Because GL entries are generated in real-time and posted to the blockchain at the same time, an investor may utilize this data and post the same on an internal accounting software to check the trial balance or other financial statements at any time.

Transactions stored on the blockchain may be based on cryptographic proof, meaning all the parties involved, including investors and auditors, may trust the data as it is recorded and be further assured in the knowledge that it cannot be tampered with.

An embodiment of the present invention is directed to storing a loan asset on a blockchain by using a secured note as a unique secured token (or non-fungible token (NFT)). An embodiment of the present invention may provide tokenization of a note to service a residential mortgage debt on a private blockchain. As recognized by an embodiment of the present invention, property may be uniquely represented by various characteristics including property address and/or property characteristics, such as bedrooms, bathrooms, garage, etc. Accordingly, an embodiment of the present invention may represent the underlying collateral (property) as a unique NFT.

An embodiment of the present invention is directed to servicing debt on various types including residential mortgages, automobile loans, etc. As the debt is being serviced, daily transactions and payment collections may be recorded on the blockchain. For example, investors (e.g., entities who own the loan) may access/login to the blockchain and view payments and associated transaction history for a portfolio. Customers may interact with a portal or web/mobile application to access an electronic wallet that stores and manages loan tokens and property tokens. The loan token may represent a customer's liability, e.g., funds that are owed. The property token may represent an asset, such as residential property, automobile, etc., that is owned by the customer. As the customer makes periodic or planned payments, equity in the asset continues to grow each month or with each payment. As the asset is a unique token on the blockchain, the customer may use the token at various marketplaces. Various transactions and interactions may be supported, such as crowdsourcing or crowdfunding a loan on the customer's equity. This provides a platform that enables a borrower to solicit funds or investments from various participants.

For example, a customer may perform an equity extraction on a loan on a property worth $1 million where $600K is owed leaving $400K of equity. According to an embodiment of the present invention, the property (e.g., residential property) may be represented as a token (e.g., NFT) on a blockchain (or distributed ledger). An embodiment of the present invention enables a customer to fractionalize the token and then transact on a portion or all of the $400K equity. The customer may perform transactions via a marketplace, cryptocurrency online platform, third party service provider, etc. For example, the customer may obtain a home equity line of credit (HELOC) through a traditional financial institution as well as through crowd funding, etc. This enables the customer/borrower to bypass a traditional financial institution and extract equity from the property and transact through an online platform. In addition, this provides a mechanism to raise capital and perform equity extraction as well as other transactions. An embodiment of the present invention is directed to an innovative decentralized marketplace that enables borrowers, investors and other participants to interact and make transactions.

With an embodiment of the present invention, investors may participate in a secondary market. For example, investors may own property or collateral that provides access to a cash flow from a pool of loans where each loan is represented as a secure token on a private blockchain. Investors may have a pool or portfolio of loans that result in a cash flow on periodic basis (e.g., monthly).

An embodiment of the present invention is directed to a digital transformation of the mortgage origination market through blockchain, distributed ledger, and smart contracts.

An embodiment of the present invention is directed to tokenizing asset debt and creating NFTs out of mortgages. An NFT is a digital asset that represents a unique real-world object that cannot be replaced with something else. Every NFT is a unique token on the blockchain with unique identification codes and data that distinguishes one from another.

According to an embodiment of the present invention, both the note and the property underlying the note may be assets from which a unique hash code may be generated. Each is unique and neither can be recreated, traded, or exchanged at equivalence.

Digital asset creation rapidly moves origination from a paper-based process, which is inherently dependent on human behavior and performance and therefore prone to delays and errors, to a streamlined closing and nearly instantaneous settlement process where blockchain is used to register title, property data, and borrower data, ensuring the accuracy and integrity of the transaction. Accordingly, various parties involved in a real estate transaction may be confident in the settlement of the transaction and the entire process may be completed effectively and securely.

An embodiment of the present invention is directed to transforming the title process with NFTs and blockchain technology. When all property records are stored on a blockchain and a home's ownership record may be verifiably and accurately traced, the authentication of the chain of title becomes easier and quicker, with less paperwork and due diligence involved for all parties. For example, title fraud may be reduced or removed, eliminating the need for title insurance. Title insurance protects buyers and/or lenders against defects such as liens, encumbrances on the title of the underlying property. Generally, purchasers are required to purchase title insurance each time a resident property is sold or transferred. Title insurance provides protection from financial loss to the buyer or lender due to defects in the title to the property. Intermediaries and service providers may be minimized or eliminated with the existence of a complete and accurate digital ownership trail.

The benefits to borrowers of creating such tokens may include lower rates, faster loan approvals, and greater flexibility around payment terms. Because information, such as customer financial data, property data (e.g., title and appraisal value, etc.) may be permanently recorded and stored on the blockchain, there is no longer a need for middlemen to verify this information. This reduces the cost and time involved in the lending process. The entire borrower experience from origination to payoff may be improved in efficiency and speed. Moreover, seamless transfers of loans may improve the originator to servicer transfer experience for borrowers.

With an embodiment of the present invention, customers may create digital wallets supported via a blockchain of financial history. Financial history may record various events or actions, such as updates on payday, whenever a banking transaction is made, whenever investment values change, when credit card charges are made, when a credit score changes, etc. This real-time data further eliminates mortgage and other credit applications. With financial data in one place, customers may become more educated about their own financial health, and they may be better able to budget, make on-time payments, feel more comfortable reaching out for help when facing financial challenges, and build long-term financial security.

For example, when a borrower decides to sell their current home, a separate NFT for the physical property streamlines the entire real estate process according to an embodiment of the present invention. Property data, including correct lien information, tax and assessment values, and current insurance and claim data may be available in one secure location and updated with new data in real-time. Real-time property value estimates mean the property may be immediately ready for a sale, a refinance and/or other transaction. With an embodiment of the present invention, the entire history of ownership, rights, and relevant property data, is recorded, absolute, and easily and instantly verified, restoring confidence and trust in the mortgage servicer.

For servicers, the creation of NFT mortgages streamlines the entire workflow process. To start, the transfer of loans from originators to servicers become more accurate, secure, and streamlined. Moreover, transfers of servicing may be facilitated simply by changing who has access to the encryption keys to a set of loans. This addresses and eliminates data inconsistencies that occur during servicing transfers. With an embodiment of the present invention, no matter how many times a loan is transferred, document integrity may be maintained and data security ensured. Ledgers may be instantaneously updated as transactions and approvals move from stakeholder to stakeholder. Payments, balances, historical transactions, and other data may be created on the blockchain and balances may be updated instantly to reflect real-time payment information.

An embodiment of the present invention is directed to improving regulatory and other compliance with digitally verified records. With data residing on the blockchain, an embodiment of the present invention facilitates the ability to adjust to new rules and regulations. According to an embodiment of the present invention, smart contracts ensure that regulatory changes may be implemented quickly and are no longer subject to interpretation. In an industry that faces near-constant regulatory uncertainty, compliance stresses may be reduced as embedded rules ensure that the steps taken during a servicing process comply with federal, state, and local regulations. With all transactions recorded and immutable, there is a clear and complete audit trail thereby reducing the costs and time associated with preparing for regulatory and agency audits.

According to an embodiment of the present invention, non-performing loan servicing may be exponentially improved with the use of smart contracts to trigger rules when specific borrower events occur. Automation of processes in this area may result in reduced paperwork, instantaneous approvals to workouts, and guided foreclosures with little-to-no human intervention. If a property exists as an NFT, the Broker Price Opinion (BPO) and valuation process may also be improved for the servicer.

In addition, cybersecurity and data privacy issues may be addressed through cryptography, which authenticates and verifies transactions as well as maintains consumer privacy by allowing servicing employees to only see the parts of the ledger that are relevant to their work.

With an embodiment of the present invention, the impact on the secondary market may be profound as immutable data increases transparency and exponentially streamlines the loan transfer process. A permanent and complete loan-level document package may exist over the life of the loan, modernizing loan trading as well as the securitization process. Mortgage-backed securities (MBS) may be created more efficiently and Mortgage Servicing Rights (MSR) may be traded faster. In a collateralized debt obligation (CDO) structure, blockchain's distributed ledgers improve the accuracy of tracking of underlying assets, data, and documents. Real-time payment information creates greater efficiencies for investors and improves loan-level performance, making the MBS markets more transparent and efficient as investors receive more timely insights into macroeconomic trends on borrowers.

According to an embodiment of the present invention, digitized assets allow payments, documents, and transactions to be tied to a specific loan on the blockchain, creating the possibility for the evolution of a new asset class and new investment opportunities based on fractional interests in the original asset. This may open access to the mortgage industry to anyone with a smart contract wallet (or non-custodial wallet), unlike today where large financial institutions and the government are the main purchasers of one of the lowest risk, consistent yield asset classes available. Investors may choose to hold whole loans or fractions of loans, which may lead to investment diversification and improved risk profiles as an entirely new market is created. Fractional ownership of property may increase access to capital for borrowers, creating the opportunity for crowdsourcing of financing and investment.

In addition, cryptocurrencies may be used to make payment distributions in seconds, providing improved liquidity to investors as well as real-time trading and settlement in the MBS market.

An embodiment of the present invention is directed to creating a property and a loan note as secured tokens or NFTs. According to an embodiment of the present invention, a property may have a combination of attributes that uniquely identifies the property. Similarly, a loan on the property may have unique attributes which are readily available in a Loan Note and/or other documents. These attributes make a Property and a Loan unique assets (a combination of different attributes) and therefore fit the requirement to create an NFT. An embodiment of the present invention is directed to representing a property as a NFT and a property loan as another NFT which are then stored on a blockchain or other platform (e.g., NFT Platform).

FIG. 6 is a listing of attributes, according to an embodiment of the present invention. 610 identifies unique property attributes and 620 identifies property loan attributes.

Upon identifying unique property attributes and loan attributes, an embodiment of the present invention may create a digit asset by combining various attributes. An embodiment of the present invention may create two separate NFTs, where the property is a secured token (e.g., NFT) and a corresponding property loan is another secured token (e.g., NFT).

According to an exemplary illustration, a seller who owns a house (property) may be ready to sell his property. A purchaser may ask the seller to convert property as an NFT. Once property is available as NFT, the purchaser may contact a lender and request a loan on Property NFT. The lender may then process a loan and a Loan Note may be prepared. The lender may convert "Loan on Property" (Loan Note) as an NFT. Accordingly, the borrower may now be associated with two NFTs, namely a Property NFT (Secured Token) and a Property Loan NFT.

An embodiment of the present invention may place these NFTs on the blockchain and add them into a NFT wallet. This asset is now ready to trade on NFT platform.

Figure 7:
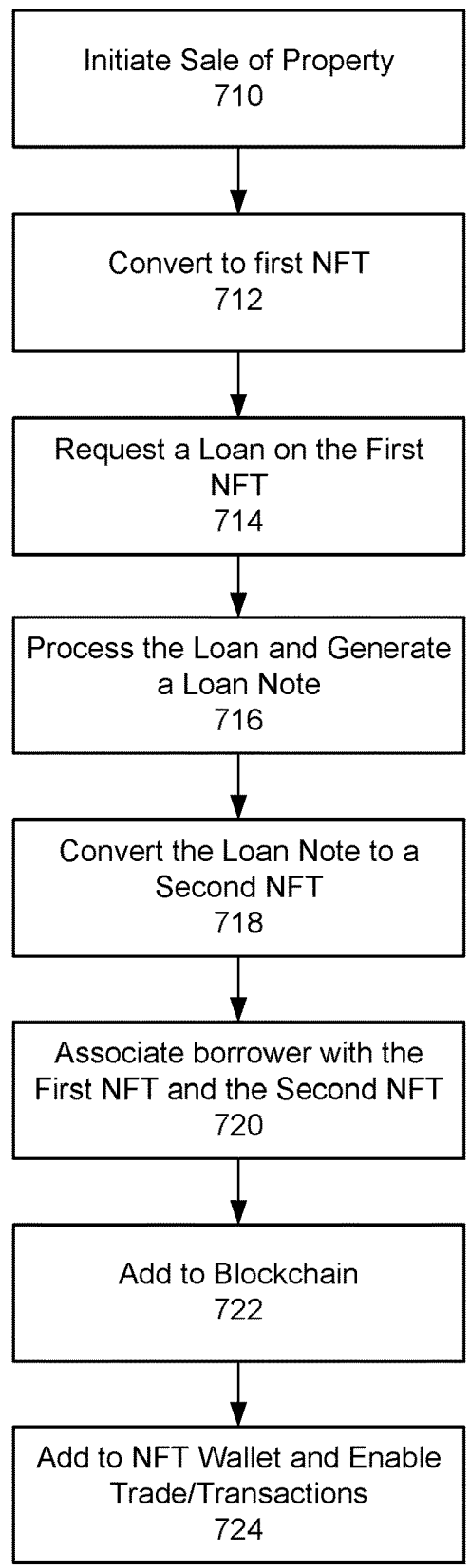
FIG. 7 is a flow diagram, according to an embodiment of the present invention.

FIG. 7 is a flow diagram, according to an embodiment of the present invention. At step 710, a sale of property may be initiated. At step 712, the property may be converted to a first NFT. At step 714, a request for a loan on the first NFT may be made. At step 716, the loan may be processed and then a loan note may be generated. At step 718, the loan note may be converted to a second NFT. At step 720, the borrower may be associated with the first NFT and the second NFT. At step 722, the first NFT and the second NFT may be added to a blockchain. At step 724, the first NFT and the second NFT may be added to an NFT wallet and transactions including trades may be enabled. While the process of FIG. 7 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 710, a sale of property may be initiated. A seller may identify a buyer for a property, such as a residential home or other real estate.

At step 712, the property may be converted to a first NFT. An embodiment of the present invention may generate a Property NFT for the property using a set of unique property attributes.

At step 714, a request for a loan on the first NFT may be made. An embodiment of the present invention may receive a request from the buyer or agent for a loan on the Property NFT.

At step 716, the loan may be processed and then a loan note may be generated. Here, a lender of the loan may process the loan and generate a Loan Note for the Property NFT.

At step 718, the loan note may be converted to a second NFT. The lender may then generate a Loan NFT for the loan on the property, represented by the Property NFT.

At step 720, the borrower may be associated with the first NFT and the second NFT. At this stage, the borrower has a Property NFT and a Loan NFT.

At step 722, the first NFT and the second NFT may be added to a blockchain.

At step 724, the first NFT and the second NFT may be added to an NFT wallet and transactions including trades may be enabled. The borrower may perform various transactions using either NFT via various platforms, services, marketplaces, etc.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein.

The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a secured token marketplace on a distributed ledger system, the system comprising:
    an interface that communicates with one or more client systems via a communication network; and
    a server comprising a computer processor coupled to the interface and in communication with a distributed ledger system, wherein the distributed ledger system comprises a blockchain system, the computer processor further configured to:
        receive, via the interface, a request for a first secured token that represents a property wherein the property is uniquely identified by a set of property attributes;
        based on the set of property attributes, generate a first secured digital token for the property by encrypting the set of property attributes and further generate a first hash value using the encrypted set of property attributes;
        process a request for a loan on the property represented by the first secured digital token to generate a loan note for the property wherein the loan note is uniquely identified by a set of loan attributes;
        based on the set of loan attributes, generate a second secured digital token for the loan note by encrypting the set of loan attributes and further generate a second hash value using the encrypted set of loan attributes;
        associate the first secured digital token and the second digital token to a borrower of the loan;
        transmit the first secured digital token and the second digital token to the distributed ledger system in an encrypted format that comprises the first and second hash values and a unique key value; and
        associate the first secured digital token and the second digital token with a digital wallet that enables one or more transactions to be made on the first secured digital token and the second digital token in a digital marketplace.

2. The system of claim 1, wherein the property comprises at least one residential real estate.

3. The system of claim 1, wherein the property comprises at least one physical asset.

4. The system of claim 1, wherein the set of property attributes comprises a street address, property type, borrower name, one or more physical characteristics of the property.

5. The system of claim 1, wherein the set of loan attributes comprises a combination of: loan identifier, note date, note amount, note interest rate, appraisal report, parcel number, product type, loan type, payment frequency, maturity date, lender and servicer identifier.

6. The system of claim 1, wherein the first secured digital token is a first non-fungible token and the second secured digital token is a second non-fungible token.

7. The system of claim 1, wherein the one or more transactions comprise an equity extraction on the property represented by the first secured digital token.

8. The system of claim 1, wherein ownership record and authentication of chain of title of the property represented by the first secured digital token is automatically verified thereby eliminating a need for title insurance for the property.

9. The system of claim 1, wherein the digital wallet comprises a financial history for each of the first secured digital token and the second digital token.

10. A method that implements a secured token marketplace on a distributed ledger system, the method comprising the steps of:
- receiving, via an interface, a request for a first secured token that represents a property wherein the property is uniquely identified by a set of property attributes, wherein the interface communicates with one or more client systems via a communication network;
- based on the set of property attributes, generating a first secured digital token for the property by encrypting the set of property attributes and further generate a first hash value using the encrypted set of property attributes;
- processing a request for a loan on the property represented by the first secured digital token to generate a loan note for the property wherein the loan note is uniquely identified by a set of loan attributes;
- based on the set of loan attributes, generating a second secured digital token for the loan note by encrypting the set of loan attributes and further generate a second hash value using the encrypted set of loan attributes;
- associating the first secured digital token and the second digital token to a borrower of the loan;
- transmitting the first secured digital token and the second digital token to a distributed ledger system in an encrypted format that comprises the first and second hash values and a unique key value, wherein the distributed ledger system comprises a blockchain system; and
- associating the first secured digital token and the second digital token with a digital wallet that enables one or more transactions to be made on the first secured digital token and the second digital token in a digital marketplace.

11. The method of claim 10, wherein the property comprises at least one residential real estate.

12. The method of claim 10, wherein the property comprises at least one physical asset.

13. The method of claim 10, wherein the set of property attributes comprises a street address, property type, borrower name, one or more physical characteristics of the property.

14. The method of claim 10, wherein the set of loan attributes comprises a combination of: loan identifier, note date, note amount, note interest rate, appraisal report, parcel number, product type, loan type, payment frequency, maturity date, lender and servicer identifier.

15. The method of claim 10, wherein the first secured digital token is a first non-fungible token and the second secured digital token is a second non-fungible token.

16. The method of claim 10, wherein the one or more transactions comprise an equity extraction on the property represented by the first secured digital token.

17. The method of claim 10, wherein ownership record and authentication of chain of title of the property represented by the first secured digital token is automatically verified thereby eliminating a need for title insurance for the property.

18. The method of claim 10, wherein the digital wallet comprises a financial history for each of the first secured digital token and the second digital token.

* * * * *